US012598333B2

(12) United States Patent
Li et al.

(10) Patent No.: US 12,598,333 B2
(45) Date of Patent: Apr. 7, 2026

(54) DATA PROCESSING METHOD AND APPARATUS, AND DEVICE, STORAGE MEDIUM AND PROGRAM PRODUCT

(71) Applicant: ZTE Corporation, Shenzhen (CN)

(72) Inventors: Qiuting Li, Shenzhen (CN); Cheng Huang, Shenzhen (CN); Yaxian Bai, Shenzhen (CN); Shaowei Xie, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/832,063

(22) PCT Filed: Mar. 1, 2023

(86) PCT No.: PCT/CN2023/079080
§ 371 (c)(1),
(2) Date: Jul. 22, 2024

(87) PCT Pub. No.: WO2023/174059
PCT Pub. Date: Sep. 21, 2023

(65) Prior Publication Data
US 2025/0106443 A1 Mar. 27, 2025

(30) Foreign Application Priority Data

Mar. 14, 2022 (CN) .......................... 202210249027.9

(51) Int. Cl.
*G06T 15/04* (2011.01)
*G06T 15/20* (2011.01)
(Continued)

(52) U.S. Cl.
CPC ....... *H04N 21/21805* (2013.01); *G06T 15/04* (2013.01); *G06T 15/20* (2013.01); *H04N 21/23614* (2013.01)

(58) Field of Classification Search
CPC ........ H04N 21/21805; H04N 21/23614; G06T 15/04; G06T 15/02
See application file for complete search history.

(56) References Cited

U.S. PATENT DOCUMENTS

2019/0306530 A1* 10/2019 Fan .................. H04N 21/21805
2021/0250568 A1 8/2021 Huang
(Continued)

FOREIGN PATENT DOCUMENTS

CN 110876051 A 3/2020
CN 113542907 A 10/2021
(Continued)

OTHER PUBLICATIONS

International Search Report and Written Opinion for International Application No. PCT/CN2023/079080, mailed Jun. 16, 2023.
(Continued)

*Primary Examiner* — Thai Q Tran
*Assistant Examiner* — Jose M Mesa
(74) *Attorney, Agent, or Firm* — Wolf, Greenfield & Sacks, P.C.

(57) ABSTRACT

A data processing method, apparatus and device, a storage medium, and a program product are disclosed. The method may include: acquiring free-viewpoint video data, the free-viewpoint video data comprises at least one texture map and/or at least one depth map; encapsulating the at least one texture map and/or the at least one depth map in at least one media track; and processing the free-viewpoint video data according to target-viewpoint information.

17 Claims, 12 Drawing Sheets

(51) Int. Cl.
_H04N 21/218_       (2011.01)
_H04N 21/236_       (2011.01)

(56)                    References Cited

U.S. PATENT DOCUMENTS

2022/0247991  A1      8/2022   Takahashi et al.
2023/0034937  A1*     2/2023   Hu ........................ H04L 65/765

FOREIGN PATENT DOCUMENTS

CN            113949829  A      1/2022
CN            114009054  A      2/2022
CN            114095737  A      2/2022
WO      WO 2021/102953  A1      6/2021

OTHER PUBLICATIONS

Office Action for Japanese Application No. 2024-524448, mailed
May 16, 2025.
Search Report for Japanese Application No. 2024-524448, mailed
May 27, 2025.

* cited by examiner

Acquire free-viewpoint video data, where the free-viewpoint video data includes a texture map and/or a depth map captured by at least one capturing apparatus

S1000

Encapsulate at least one texture map and/or at least one depth map in at least one media track

S2000

Process the free-viewpoint video data according to target-viewpoint information

S3000

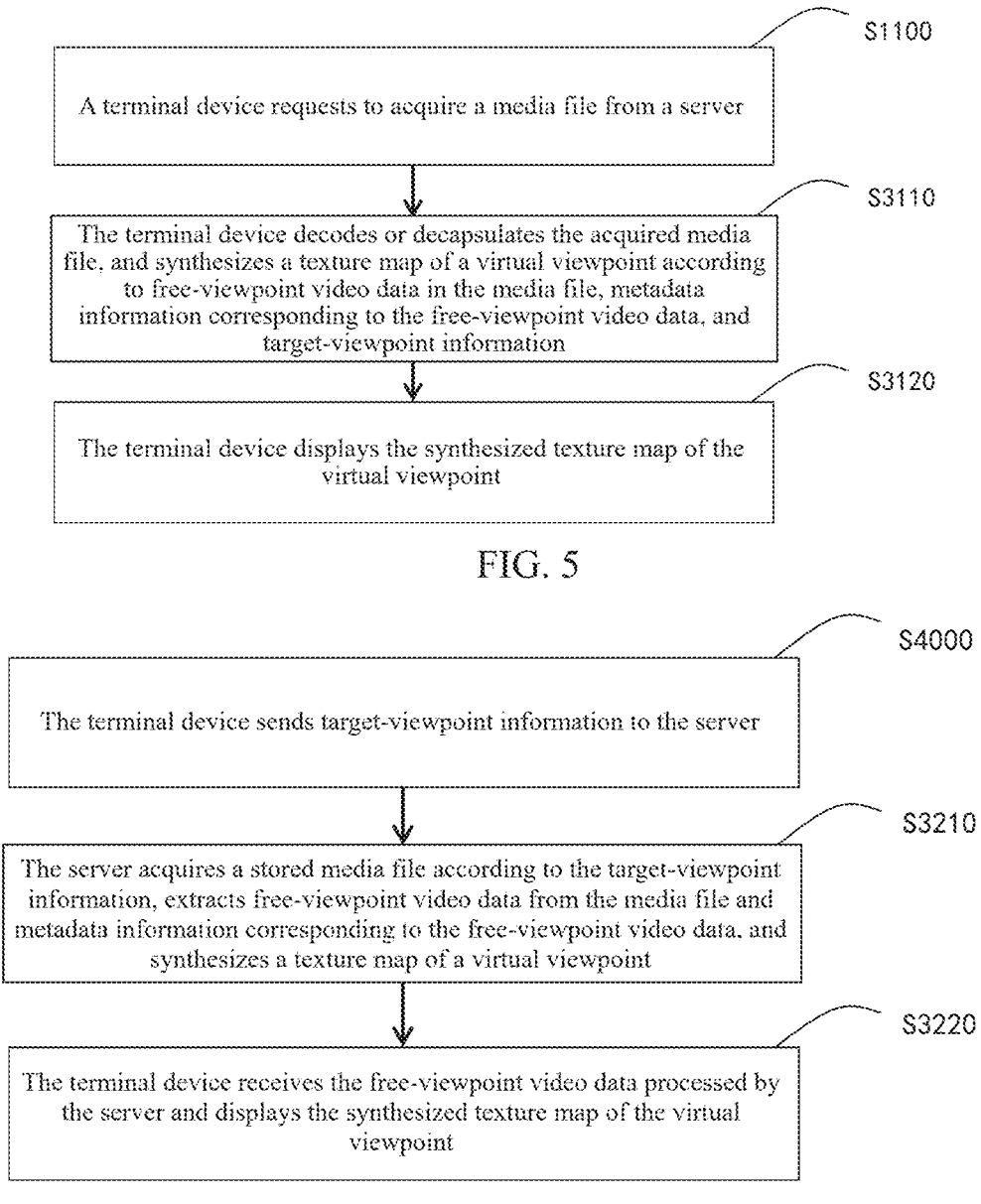

S1100

A terminal device requests to acquire a media file from a server

S3110

The terminal device decodes or decapsulates the acquired media file, and synthesizes a texture map of a virtual viewpoint according to free-viewpoint video data in the media file, metadata information corresponding to the free-viewpoint video data, and target-viewpoint information

S3120

The terminal device displays the synthesized texture map of the virtual viewpoint

The terminal device sends target-viewpoint information to the server

S3210

The server acquires a stored media file according to the target-viewpoint information, extracts free-viewpoint video data from the media file and metadata information corresponding to the free-viewpoint video data, and synthesizes a texture map of a virtual viewpoint

S3220

The terminal device receives the free-viewpoint video data processed by the server and displays the synthesized texture map of the virtual viewpoint

FIG. 6

Data processing apparatus

Acquisition module    700

Encapsulation module    800

Processing module    900

Display module    1000

DATA PROCESSING METHOD AND APPARATUS, AND DEVICE, STORAGE MEDIUM AND PROGRAM PRODUCT

CROSS-REFERENCE TO RELATED APPLICATION

This application is a national stage filing under 35 U.S.C. § 371 of International Patent Application Serial No. PCT/CN2023/079080, filed Mar. 1, 2023, which claims priority to Chinese patent application No. 202210249027.9, filed Mar. 14, 2022. The contents of these applications are incorporated herein by reference in their entirety.

TECHNICAL FIELD

Embodiments of the present disclosure relate to the field of computer technologies, and more particularly, to a data processing method, apparatus and device, a storage medium, and a program product.

BACKGROUND

With the development of computer technologies, users hope to achieve a stronger immersive experience in video playing, virtual games and other scenarios through free viewpoint switching.

In existing technologies, limited by low efficiency of media data processing and transmission, it is difficult for users to implement flexible viewpoint switching and scene displaying. How to increase the data processing efficiency and improve user experience is an urgent problem to be discussed and addressed at present.

SUMMARY

Embodiments of the present disclosure provide a data processing method, apparatus and device, a computer-readable storage medium, and a computer program product, to increase the data processing efficiency.

In accordance with a first aspect of the present disclosure, an embodiment provides a data processing method, including: acquiring free-viewpoint video data, where the free-viewpoint video data includes at least one texture map and/or at least one depth map; encapsulating the at least one texture map and/or the at least one depth map in at least one media track; and processing the free-viewpoint video data according to target-viewpoint information.

In accordance with a second aspect of the present disclosure, an embodiment provides an image display apparatus, including: an acquisition module, configured for acquiring free-viewpoint video data and target-viewpoint information, where the free-viewpoint video data includes at least one texture map and/or at least one depth map; an encapsulation module, configured for encapsulating the at least one texture map and/or the at least one depth map in at least one media track; and a processing module, configured for processing the free-viewpoint video data according to the target-viewpoint information.

In accordance with a third aspect of the present disclosure, an embodiment provides a computer-readable storage medium, storing a computer-executable instruction which, when executed by a processor, causes the processor to carry out the data processing method in accordance with the first aspect.

In accordance with a fourth aspect of the present disclosure, an embodiment provides a computer program product, including a computer program or computer instructions stored in a computer-readable storage medium, a processor of a computer device reads the computer program or the computer instructions from the computer-readable storage medium and executes the computer program or the computer instructions to cause the computer device to carry out the data processing method in accordance with the first aspect.

BRIEF DESCRIPTION OF DRAWINGS

FIG. 5 is a flowchart of a data processing method according to an embodiment of the present disclosure;

FIG. 6 is a flowchart of a data processing method according to an embodiment of the present disclosure;

DETAILED DESCRIPTION

Figures 1, 2:
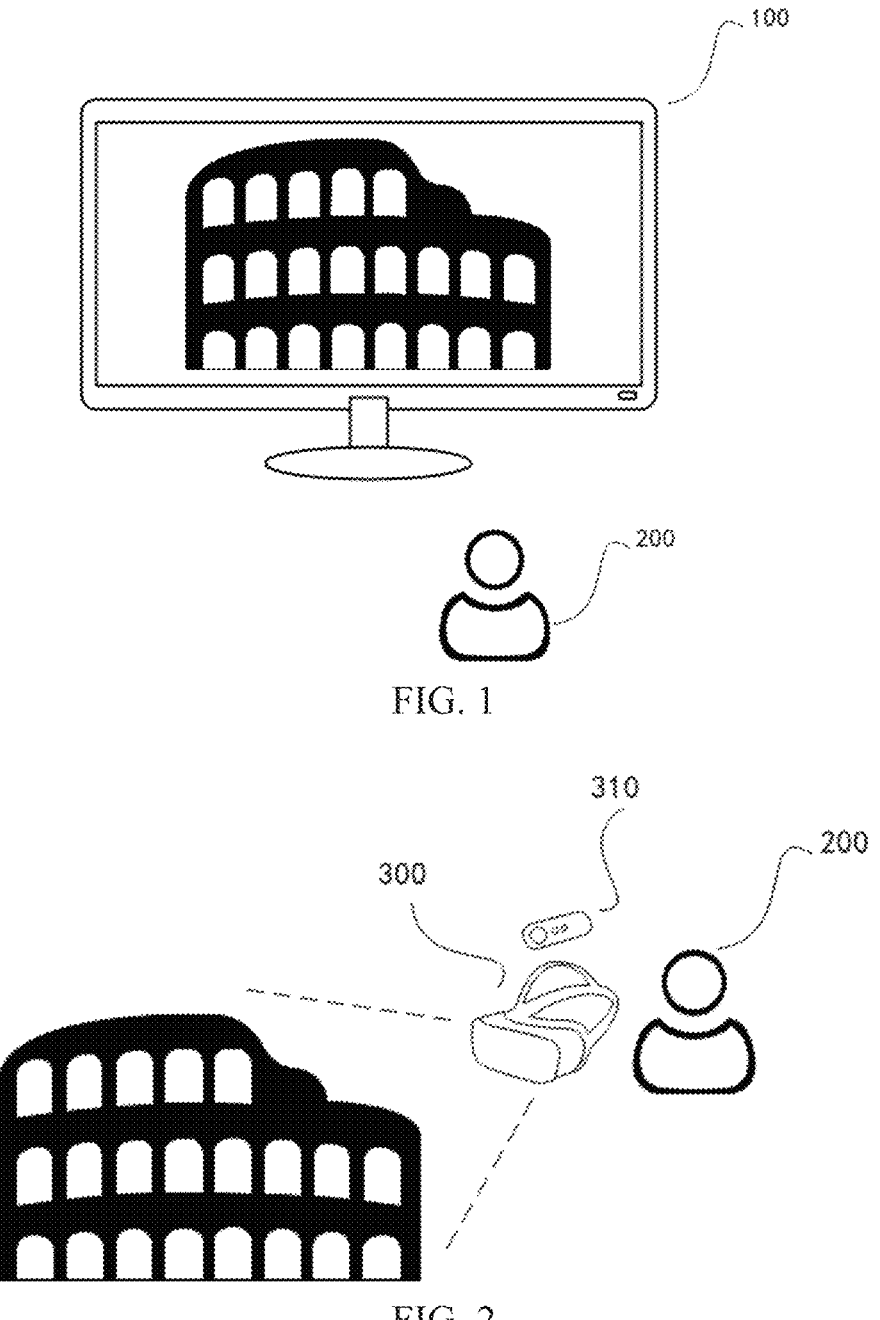
FIG. 1 is a schematic diagram of a user viewing live streaming content through a display apparatus.
FIG. 2 is a schematic diagram of a user viewing video content through another display apparatus.

To make the objects, technical schemes, and advantages of the present disclosure clear, the present disclosure is described in further detail in conjunction with accompanying drawings and examples. It should be understood that the specific embodiments described herein are merely used for illustrating the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

In the description of the embodiments of the present disclosure, unless otherwise explicitly defined, the terms such as "configure", "install/mount" and "connect" should be understood in a broad sense, and those having ordinary skills in the art can reasonably determine the specific meanings of the above terms in the embodiments of the present disclosure based on the specific contents of the technical schemes. In the embodiments of the present disclosure, any embodiment or design described following the terms such as "in an embodiment," "in some embodiments," and "for example" is used to indicate examples, explanations, or illustrations, and should not be construed as being superior to or advantageous over other embodiments or designs. The use of the terms such as "in an embodiment," "in some embodiments," and "for example" is intended to present the relevant concepts in a concrete manner.

The embodiments of the present disclosure may be applied to various devices related to image and video display, such as a mobile phone, a tablet computer, a desktop computer, a notebook computer, a wearable device, a vehicle-mounted device, a liquid crystal display, a cathode ray tube display, a holographic imaging display, a projector, and other terminal devices, and may also be applied to various devices for processing image and video data, such as a mobile phone, a tablet computer, a desktop computer, a notebook computer, a wearable device, a vehicle-mounted device, and other server devices, which is not limited in the embodiments of the present disclosure.

Immersive media enables users to experience a highly realistic virtual space environment visually and audibly through video, audio and other technologies, and feel as if he or she is part of the scene. In related technologies, a user wearing a head-mounted display device can watch 360-degree video images by freely rotating his or her head, i.e., have an immersive 3 Degrees of Freedom (3DOF) experience. To provide a better visual experience, related technologies can also support 3 Degrees of Freedom Plus (3DOF+) and 6 Degrees of Freedom (6DOF) videos, i.e., the user's head or body can move in space in a limited or unlimited manner to realize free view switching to obtain a more realistic immersive experience.

For example, a variety of methods may be used to capture and play a 6DOF video. Free-viewpoint video is one of the methods. A free-viewpoint video is usually a collection of videos acquired by shooting the same three-dimensional scene from different views using a multi-camera matrix array. The user can freely perform view switching during viewing the free-viewpoint video, to view a corresponding video image at a real viewpoint or a synthesized virtual viewpoint. Free-viewpoint video data includes texture maps and depth maps of multiple views. If the user switches to a real viewpoint, a real video captured by a camera may be directly displayed. If the user switches to a virtual viewpoint, a virtual viewpoint texture map corresponding to the virtual viewpoint may be synthesized in real time. Positions and the number of cameras deployed in the process of free-viewpoint video data acquisition, and the selection, transmission and processing of video data corresponding to cameras in the process of real-time synthesis of virtual viewpoint images have different degrees of impact on the time consumption and quality of data synthesis, directly affecting the user experience.

Free-viewpoint video is a novel Virtual Reality (VR) video technology, which generally uses multiple cameras to shoot around a target scene, and uses a virtual view synthesis technology to acquire a virtual view image. The free-viewpoint video technology enables the user to view the target scene from any viewpoint and obtain a better viewing experience than a panoramic video. However, at present, a free-viewpoint video of a target scene cannot be provided for the user during live streaming of the target scene. Therefore, how to enable the user to view some contents of interest in the live streaming video from a desired viewpoint during the live streaming is an urgent technical problem to be solved by those having ordinary skills in the art.

To set forth the technical schemes of the present disclosure, related technologies are further illustrated with reference to examples shown in FIG. 1 and FIG. 2.

FIG. 1 is a schematic diagram of a user viewing live streaming content through a display apparatus. As shown in FIG. 1, a user 200 views live streaming content through a first display apparatus 100. However, the user 200 can view content in the live streaming scene only from the current viewpoint at which the display apparatus displays the live streaming scene, and cannot adjust the viewpoint at will.

FIG. 2 is a schematic diagram of a user viewing video content through another display apparatus. As shown in FIG. 2, a user 200 views video content through a second display apparatus 300. With the use of the second display apparatus 300, the user 200 can switch the viewpoint by rotating his or her head or can switch the viewpoint by using a remote controller 310 of the second display apparatus 300. Although this method can provide three-dimensional images and allow the user to adjust the viewpoint at will, it cannot meet requirements of 3DOF and 6DOF application scenarios due to the low efficiency of image selection, transmission, and processing, and cannot be applied to application scenarios requiring real-time displaying or synthesis of images.

Embodiments of the present disclosure provide a data processing method, apparatus and device, a computer-readable storage medium, and a computer program product, in which texture maps and depth maps are encapsulated in media tracks, such that the data processing efficiency is improved, and the flexibility of data encapsulation and transmission is improved, thereby improving the efficiency of free-viewpoint video processing.

The embodiments of the present disclosure will be further described in detail below in conjunction with the accompanying drawings.

Figures 3, 4:
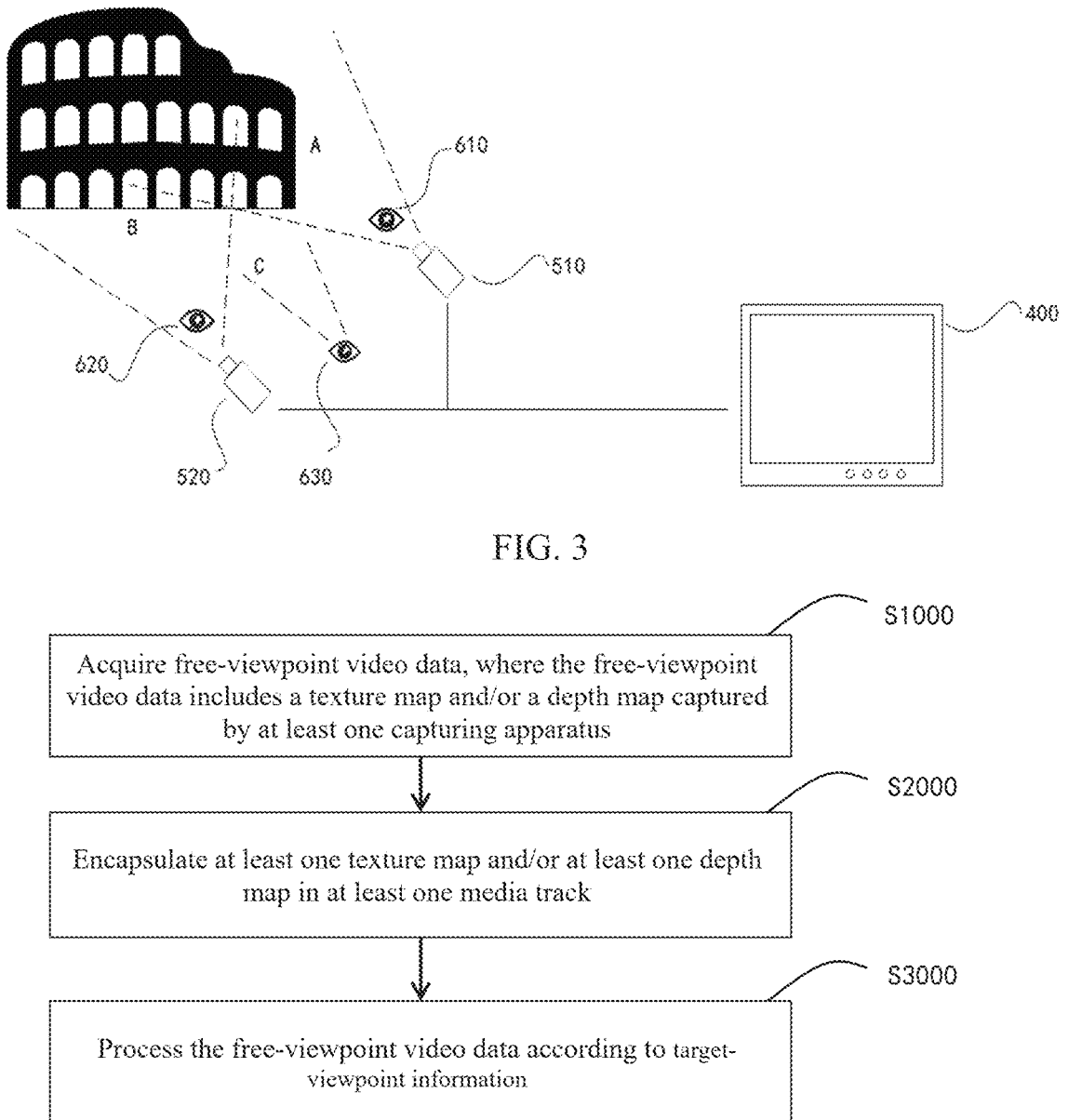
FIG. 3 is a schematic diagram of a system architecture of an application scenario of a data processing method according to an embodiment of the present disclosure.
FIG. 4 is a flowchart of a data processing method according to an embodiment of the present disclosure.

FIG. 3 is a schematic diagram of a system architecture of an application scenario of a data processing method according to an embodiment of the present disclosure. As shown in FIG. 3, the system architecture includes a data processing apparatus 400 and a data acquisition apparatus.

In this embodiment, for example, the system architecture includes two data acquisition apparatuses, namely, a first image capturing apparatus 510 and a second image capturing apparatus 520. The first image capturing apparatus 510 is configured for capturing image data of a first area A. The second image capturing apparatus 520 is configured for capturing image data of a second area B.

It can be understood that free-viewpoint video data in this embodiment is captured by the first image capturing apparatus 510 and the second image capturing apparatus 520.

The data processing apparatus 400 is configured for acquiring the free-viewpoint video data.

In an implementation, the free-viewpoint video data includes a first texture map captured by the first image capturing apparatus 510 and a second texture map captured by the second image capturing apparatus 520.

In an implementation, the free-viewpoint video data includes a first depth map captured by the first image capturing apparatus 510 and a second depth map captured by the second image capturing apparatus 520.

In another implementation, the free-viewpoint video data includes a first texture map and a first depth map captured by the first image capturing apparatus 510 and a second texture map and a second depth map captured by the second image capturing apparatus 520.

It should be noted that the texture maps and the depth maps may be captured by the capturing apparatuses, or may be obtained by other means, e.g., generated by a computer.

A first viewpoint 610 is a viewpoint at which the first area A is viewed. A second viewpoint 620 is a viewpoint at which the second area B is viewed.

In an implementation, when the user views the first area A, the data processing apparatus 400 acquires the first texture map captured by the first image capturing apparatus 510, and respectively encapsulates and processes the first texture map using an encapsulation module and a processing module, to obtain free-viewpoint video data of the current viewpoint. When the user intends to view the second area B, the data processing apparatus 400 acquires the second texture map captured by the second image capturing apparatus 520, and respectively encapsulates and processes the second texture map using an encapsulation module and a processing module, to obtain free-viewpoint video data of the current viewpoint. The technical scheme of this embodiment enables the user to freely switch to the required viewpoint quickly in real time, thereby improving the viewing experience.

In another embodiment, when the user intends to view a third area C from a third viewpoint 630 (i.e., virtual viewpoint), the data processing apparatus 400 first determines the first area A and/or the second area B adjacent to the third area C, i.e., first determines the first viewpoint 610 or the second viewpoint 620 adjacent to the third viewpoint 630, then processes the first depth map captured by the capturing apparatus 510 corresponding to the first viewpoint 610 and/or the second depth map captured by the capturing apparatus 520 corresponding to the second viewpoint 620 to synthesize a third depth map corresponding to the third viewpoint 630, and finally combines the third depth map with the first texture map captured by the capturing apparatus 510 corresponding to the first viewpoint 610 and/or the second texture map captured by the capturing apparatus 520 corresponding to the second viewpoint 620 to obtain a third texture map corresponding to the third viewpoint 630 (i.e., virtual viewpoint), thus obtaining free-viewpoint video data of the current viewpoint. The technical scheme of this embodiment not only can reduce the use of capturing apparatuses, but also can realize free view switching to obtain a more realistic immersive experience.

In another embodiment, the texture maps and the depth maps may be obtained by other means. For example, the depth maps may be obtained through calculation based on the texture maps, or the texture maps and the depth maps are simulation data generated by a computer.

FIG. 4 is a flowchart of a data processing method according to an embodiment of the present disclosure. As shown in FIG. 4, the data processing method may be applied to a terminal device or a server. In the embodiment shown in FIG. 4, the data processing method may include, but not limited to, the following steps S1000, S2000, and S3000.

At S1000, free-viewpoint video data is acquired.

In an embodiment, the free-viewpoint video data includes a texture map.

In an embodiment, the free-viewpoint video data includes a depth map.

In an embodiment, the free-viewpoint video data includes a texture map and a depth map.

It should be noted that the texture maps and the depth maps may be captured by a capturing apparatus, or may be obtained by other means, e.g., generated by a computer. The following description is given using an example where the texture maps and the depth maps are captured by a capturing apparatus.

A free-viewpoint video is a collection of videos acquired by shooting the same three-dimensional scene from different views using a multi-camera matrix array. Free-viewpoint video data is usually captured by a plurality of capturing apparatuses. The capturing apparatuses are arranged at different angles and positions to capture images of a scene or an object to be photographed. The capturing apparatuses may each be a camera or any other apparatus capable of capturing an image. It should be noted that one or more capturing apparatuses may be arranged, and the number of capturing apparatuses is not limited in the embodiments of the present disclosure.

The free-viewpoint video can support synthesis of video images under a free viewpoint. Video data usually includes a texture map and a depth map. The texture map records data of surface properties of the object to be photographed. A real video image can be obtained by rendering the texture map. The depth map, also known as range image, directly reflects the geometric shape of a visible surface of the object. The depth map is similar to a grayscale image, but each pixel value in the depth map represents an actual distance from a camera to each point on the object. It should be noted that in some application scenarios, such as those where the storage capacity and computing capacity of the terminal device are limited or where the degree of freedom of view switching is limited, the free-viewpoint video data may include only a texture map or a depth map.

In an embodiment, when there is no capturing apparatus corresponding to a switched viewpoint, a virtual viewpoint corresponding to the view is synthesized. During the synthesis of the virtual viewpoint, after several cameras corresponding to views adjacent to the target view of view switching, depth maps of the cameras are processed first, and then the processed depth map are combined with texture maps of the cameras to synthesize a texture map corresponding to the virtual viewpoint. Therefore, in the application scenario corresponding to this embodiment, the free-viewpoint video includes texture map data and depth map data.

In an embodiment, when the degree of freedom of view switching is limited, i.e., when switching is performed between real viewpoints corresponding to the cameras without needing to synthesizing a virtual viewpoint, or when the capturing apparatus does not have a depth map capturing capability, in the application scenario corresponding to this embodiment, the free-viewpoint video includes texture map data only, and does not include depth map data. Alternatively, when there is a capturing apparatus corresponding to the target view of view switching, a texture map corresponding to the capturing apparatus is used without needing to synthesize a virtual viewpoint using a depth map.

At S2000, at least one texture map and/or at least one depth map is encapsulated in at least one media track.

To support the storage, transmission, and processing of free-viewpoint video data in a media system, it is necessary to define a reasonable format structure for free-viewpoint video data in a media file.

It should be noted that in the embodiments of the present disclosure, one implementation is to store free-viewpoint video data in the file based on an International Organization for Standardization Base Media File Format (ISO BMFF) format. It should be noted that in a limited scheme, i.e., in an application scenario where virtual viewpoints need to be synthesized, for ISO basic media file formats of an information box, a track reference box, a track group box, and the like, reference may be made to MPEG-4 Part 12 ISO Base Media File Format formulated by ISO/IEC JTC1/SC29/WG11.

Based on the ISO BMFF format, all data are packed in a box. The ISO BMFF format includes several boxes, each of which has a type and length, and can be regarded as a data object. A box that can accommodate other boxes is called a container box. Using a Moving Picture Experts Group Audio Layer IV (MP4) file as an example, the MP4 file includes one "ftyp" box. The ftyp box is used as an identifier of the file format and contains some information about the file. The MP4 file further includes one "MOOV" box (Movie Box), which is a container box. Sub-boxes of the MOOV box contains metadata information of media. The metadata information is descriptive information of media content. Media data of the MP4 file is contained in a Media Data Box ("mdat" box). The mdat box is also a container box. A plurality of mdat boxes may exist. When all the media data is referenced from other files, there may be no mdat box. The structure of the media data is described using metadata. A Meta Box ("meta" box) may be used to describe some general or additional un-timed metadata. The meta box is also a container box.

Timed metadata track is a mechanism for timed metadata that can be associated with particular samples in the ISO BMFF. The timed metadata is less tightly coupled to the media data and is typically "descriptive".

In commonly seen application scenarios, the free-viewpoint video data includes texture map data and depth map data, and virtual viewpoint synthesis is usually performed during free viewpoint switching, so a free-viewpoint video media track should be represented as a restricted video in the media file. In an embodiment of the present disclosure, SchemeTypeBox in RestrictedSchemeInfoBox defined in ISO/IEC 14496-12 is used to describe the free-viewpoint video media track, where scheme_type of SchemeTypeBox is set to 'as3f'.

Free-viewpoint video tracks use VisualSampleEntry, as defined in ISO/IEC 19946-12. A free-viewpoint video media track containing only a texture map is a texture map media track. A depth map media track uses a handler type 'auxv' in HandlerBox in MediaBox to indicate that the media track contains depth map information.

It should be noted that when the free-viewpoint video contains only texture map data, no virtual viewpoint synthesis process is performed, and the free-viewpoint video media track is not to be represented as a restricted video in the media file, i.e., SchemeTypeBox is not used to describe the free-viewpoint video media track.

In an embodiment, texture maps and depth maps captured by capturing apparatuses are encapsulated in one media track, i.e., the texture maps and the depth maps are included in one media track.

In an embodiment, texture maps captured by capturing apparatuses are encapsulated in one media track, i.e., the texture maps are included in one media track.

In an embodiment, depth maps captured by capturing apparatuses are encapsulated in one media track, i.e., the depth maps are included in one media track.

In the above embodiments, encapsulation of video data using one media track may be collectively referred to as single-track encapsulation. Single-track encapsulation of free-viewpoint video data is generally applicable to cases where the number of capturing apparatuses is small and the number of pixels in a single texture map is small. In such cases, when the terminal device requests to acquire a texture map and/or a depth map of a corresponding capturing apparatus, the server transmits texture maps and/or depth maps of all cameras in the media file to the terminal device. The terminal device may download texture maps and/or depth maps of all capturing apparatuses in advance. During decapsulation and decoding, the terminal device selects capturing apparatuses related to the target view of free view switching, and obtains texture maps and depth maps of the capturing apparatuses for synthesizing the virtual viewpoint. The required texture maps and/or depth maps corresponding to the capturing apparatuses may be found locally at the terminal device, and all the texture maps and depth maps or the required texture maps and depth maps corresponding to the related capturing apparatuses are decoded.

In an embodiment, texture maps and depth maps captured by capturing apparatuses are encapsulated in multiple media tracks, i.e., the texture maps are included in one or more media tracks and the depth maps are included in one or more other media tracks.

In an embodiment, texture maps captured by capturing apparatuses are encapsulated in multiple media tracks, i.e., the texture maps are included in multiple media tracks.

In an embodiment, depth maps captured by capturing apparatuses are encapsulated in multiple media tracks, i.e., the depth maps are included in multiple media tracks.

In the above embodiments, encapsulation of video data using multiple media tracks may be collectively referred to as multi-track encapsulation. Different from single-track encapsulation, multi-track encapsulation is generally applicable to cases where the number of capturing apparatuses is large and the number of pixels in a single texture map is large, which leads to a large amount of data. Texture maps and depth maps captured by capturing apparatuses are encapsulated into different media tracks. Texture map data and depth map data of one or more capturing apparatuses are encapsulated into one media track according to different encoding modes, access requirements, and transmission capabilities. A media track into which texture map data is encapsulated is a texture map media track. A media track into which depth map data is encapsulated is a depth map media track.

It should be noted that the encapsulation of texture maps and/or depth maps into one or more media tracks may be executed by any processing apparatus with an encapsulation capability.

At S3000, the free-viewpoint video data is processed according to target-viewpoint information.

After the user performs view switching, the terminal device can obtain the target-viewpoint information. The target-viewpoint information reflects a free view expected by the user or a playback view expected by a director, and generally includes a viewing position, a viewing direction, and the like. Whether a virtual viewpoint needs to be synthesized, and video data of original capturing apparatuses required for synthesis can be determined according to the target-viewpoint information.

In an embodiment, the target-viewpoint information includes a capturing apparatus identifier, capturing apparatus parameter information, target view position information, target view rotation information, a target view identifier, etc.

In an embodiment, the terminal device has a strong data processing capability, so that the terminal device processes the free-viewpoint video data according to the target-viewpoint information and displays the processed free-viewpoint video data.

FIG. 5 is a flowchart of a data processing method according to an embodiment of the present disclosure. As shown in FIG. 5, a data processing method of a terminal device is described, which may include, but not limited to, the following steps S1100, S3110, and S3120.

At S1100, the terminal device requests to acquire a media file from a server.

At S3110, the terminal device decodes or decapsulates the acquired media file, and synthesizes a texture map of a virtual viewpoint according to free-viewpoint video data in the media file, metadata information corresponding to the free-viewpoint video data, and target-viewpoint information.

At S3120, the terminal device displays the synthesized texture map of the virtual viewpoint.

In an embodiment, the terminal device does not have a strong data processing capability, so that the server may process the free-viewpoint video data according to the target-viewpoint information, e.g., synthesize a texture map of the virtual viewpoint, and then send the processed video data to the terminal device for display.

FIG. 6 is a flowchart of a data processing method according to an embodiment of the present disclosure. As shown in FIG. 6, a data processing method of a terminal device and a server is described, which may include, but not limited to, the following steps S4000, S3210, and S3220.

At S4000, the terminal device sends target-viewpoint information to the server.

At S3110, the server acquires a stored media file according to the target-viewpoint information, extracts free-viewpoint video data from the media file and metadata information corresponding to the free-viewpoint video data, and synthesizes a texture map of a virtual viewpoint.

At S3120, the terminal device receives the free-viewpoint video data processed by the server and displays the synthesized texture map of the virtual viewpoint.

It should be noted that in the embodiments corresponding to FIG. 5 and FIG. 6, the data processing method provided by the present disclosure is adopted, and the processed texture map and/or depth map is encapsulated in at least one media track, regardless of whether the terminal device synthesizes the texture map of the virtual viewpoint or the server synthesizes the texture map of the virtual viewpoint.

Figure 7:
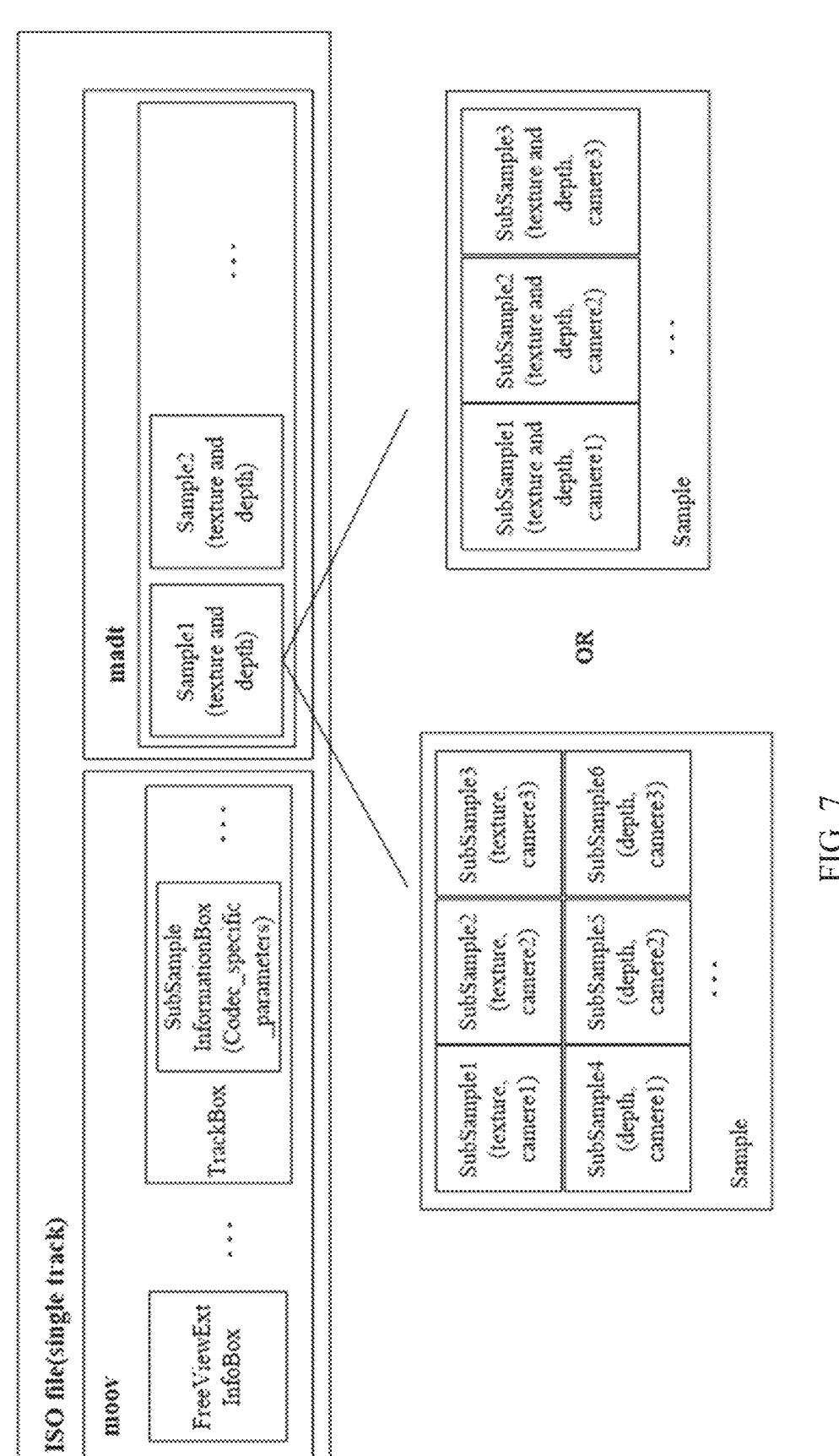
FIG. 7 is a diagram of a file structure of single-track encapsulation of free-viewpoint video data according to an embodiment of the present disclosure.

FIG. 7 is a diagram of a file structure of single-track encapsulation of free-viewpoint video data. As shown in FIG. 7, a media file based on the ISO BMFF format has a media track, which includes a MOOV box and a madt box. The MOOV box contains a sub-box FreeViewExtInfoBox and a sub-box TrackBox, and metadata information of media is encapsulated in the MOOV box. Free-viewpoint video data is encapsulated in the madt box in the form of samples.

In another embodiment, the MOOV box contains a sub-box TrackBox, and a sub-box FreeViewExtInfoBox contained in the sub-box TrackBox.

Free-viewpoint video data encapsulated in a single track includes texture map data and depth map data captured by a plurality of original capturing apparatuses. All the texture map data and the depth map data are stored in one media track, i.e., each frame of image in the media track includes texture maps and/or depth maps captured by all the original capturing apparatuses at a particular moment. The texture map and the depth map of each original capturing apparatus are encoded and decoded independently, i.e., there is no dependency between the encoding and decoding of texture map data and depth map data of the capturing apparatus. When the terminal device acquires free-viewpoint video encapsulated in a single track, the texture map data and the depth map data of all the original capturing apparatuses are transmitted.

After obtaining a media file including free-viewpoint video data, the terminal device selects texture maps and depth maps captured by several original capturing apparatuses corresponding to adjacent views required for synthesizing the virtual viewpoint from each frame of image, and decodes the selected texture maps and depth maps. For single-track encapsulation, each sample in the media track includes texture maps and/or depth maps captured by all the original capturing apparatuses at a particular moment, and is divided into sub-samples, each of which includes a texture map or/and a depth map corresponding to one capturing apparatus. To be specific, a box SubSampleInformationBox in SampleTableBox or TrackFragmentBox is used to describe sub-sample information. The use of sub-samples is based on a flags field in the sub-sample information box. The flags field can identify a data type stored in the sub-sample, i.e., three cases: texture map only, depth map only, and texture map and depth map. The specific composition structure of each sample corresponding to free-viewpoint video data is described using codec_specific_parameters. Two specific examples are given below.

Example One

The flags field is used to indicate the type of information encapsulated in the sub-sample. Specific types are as follows.

When the flags field has a value of 0, it indicates that the sub-sample is based on a texture map and a depth map corresponding to an original capturing apparatus, and one sub-sample includes a texture map or a depth map corresponding to one original capturing apparatus.

When the flags field has a value of 1, it indicates that the sub-sample is based on an original capturing apparatus, and one sub-sample includes a texture map and a depth map corresponding to one original capturing apparatus.

```
if (flags==0) {
    unsigned int(8) camera_id;
    unsigned int(1) payload_type;
    unsigned int(1) All_data;// optional
    bit(21) reserved = 0;
}
else if (flags==1) {
    unsigned int(8) camera_id;
    bit(21) reserved = 0;
}
```

Example Two

The flags field is used to indicate the type of information encapsulated in the sub-sample. Specific types are as follows.

When the flags field has a value of 0, it indicates that the sub-sample is based on the data type (original map or depth map), and one sub-sample includes a texture map or a depth map corresponding to one original capturing apparatus.

When the flags field has a value of 1, it indicates that the sub-sample is based on an original capturing apparatus, and one sub-sample includes a texture map and a depth map corresponding to one original capturing apparatus.

```
if (flags==0) {
    unsigned int(16) camera_id;
    bit(16) reserved = 0;
}
else if (flags==1) {
    unsigned int(8) payload_type;
    bit(24) reserved = 0;
}
``` where camera_id indicates an identifier of a capturing apparatus (camera) corresponding to the texture map or depth map in the current sub-sample;

payload_type indicates the type of data the sub-sample contains, where a value of 0 indicates that the sub-sample includes a texture map, a value of 1 indicates that the sub-sample includes a depth map, and a value of 2 indicates that the sub-sample includes parameter information, e.g., supplemental enhancement information (SEI); and All_data indicates that the sub-sample includes texture maps or depth maps corresponding to all the original capturing apparatuses.

It should be noted that in the virtual viewpoint synthesis process, the first choice is to process selected depth maps of original capturing apparatuses. To further simplify the encapsulation structure and the decoding process, each sample in the media track includes a texture map sub-sample and a depth map sub-sample. The texture map sub-sample includes texture maps of a plurality of original capturing apparatuses. The depth map sub-sample includes depth maps of a plurality of original capturing apparatuses or even depth maps of all original capturing apparatuses. A specific structure of the texture map sub-sample and the depth map sub-sample may also be described using codec_specific_parameters defined in this embodiment.

It should be noted that when the method in Example one is used for definition, one SubSampleInformationBox is used to describe the structure information of the sub-sample. When the flags field is 0, camera_id is set to 0, indicating that the sub-sample includes texture maps or depth maps of all original capturing apparatuses. When the method in Example two is used for definition, two SubSampleInformationBox may be used to describe the structure information of the sub-sample. In one SubSampleInformationBox, the value of the flags field is 0, and camera_id is set to 0, indicating that the depth maps or texture maps of all the original capturing apparatus are in one sub-sample. In the other SubSampleInformationBox, the value of the flags field is 1. When the value of the flags field is 1, it indicates that the sub-sample includes a texture map or a depth map.

With the use of SubSampleInformationBox to describe the size of each sub-sample in the sample, the corresponding original capturing apparatuses, and the image data type (texture map or depth map), texture maps and depth maps of original cameras required for synthesizing the virtual viewpoint can be selectively partially decoded, thereby improving the data processing efficiency and expanding the range of application scenarios of free-viewpoint video.

In an embodiment, in the process of free view switching, the user switches between real viewpoints corresponding to original capturing apparatuses, and no virtual viewpoint synthesis process is performed. In this case, free-viewpoint video data generally encapsulated in a single track is texture map data of the original capturing apparatus, and there is no depth map in the sub-sample, i.e., the value of payload_type is always 0.

In some embodiments, there is a very large amount of free-viewpoint video data, i.e., for example, a large number of original capturing apparatuses are deployed, the texture map captured includes a large number of pixels, or there is a grouping relationship between original capturing apparatuses. In this case, the free-viewpoint video data may be encapsulated by extending the single-track encapsulation mode.

Figure 8:
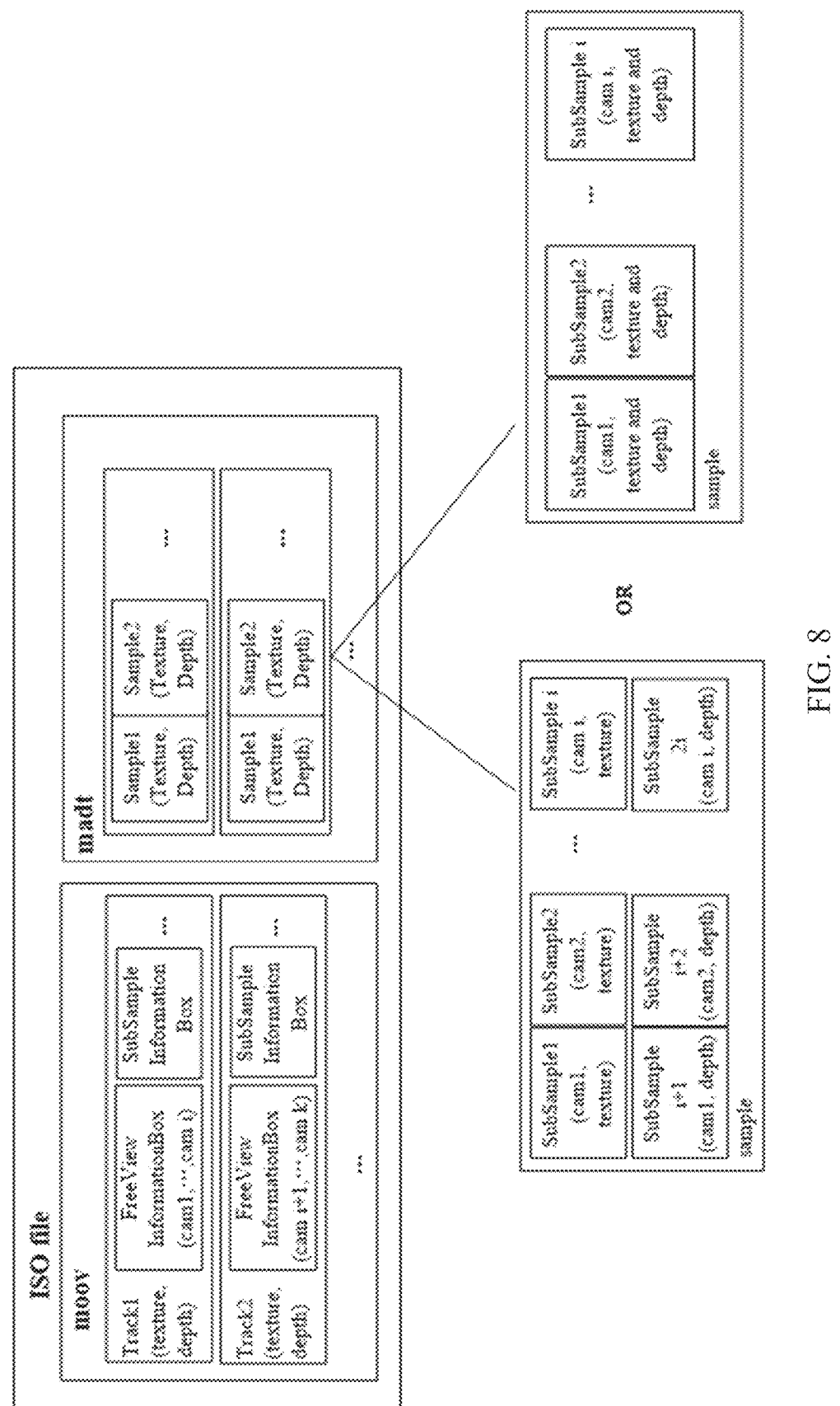
FIG. 8 is diagram of a media file structure diagram of a free-viewpoint video extended based on the single-track encapsulation mode according to an embodiment of the present disclosure.

FIG. 8 is diagram of a media file structure diagram of a free-viewpoint video extended based on the single-track encapsulation mode. As shown in FIG. 8, a media file based on the ISO BMFF format has multiple media tracks, each of which includes a MOOV box and a madt box. The MOOV box contains a sub-box FreeViewExtInfoBox and a SubSampleInfoBox, and metadata information of media is encapsulated in the MOOV box. Free-viewpoint video data is encapsulated in the madt box in the form of samples.

In the media file structure extended based on single-track encapsulation, texture maps and depth maps are in a one-to-one correspondence, and each sample in the track includes texture maps and depth maps captured by a plurality of original capturing apparatuses at a particular moment. A box SubSampleInformationBox in SampleTableBox or TrackFragmentBox is used to describe sub-sample information. The structure of each sub-sample is described using the syntax element codec_specific_parameters defined in the above embodiments. Each sub-sample includes texture maps and/or depth maps of one or more original capturing apparatuses.

In an embodiment, a texture map and a depth map encapsulated in a media track are encoded using a video coding method such as AVS2, AVC, or HEVC, etc., and if encoding information of a free-viewpoint video is extended or supplemented, the extended or supplemented encoding information may be directly stored in a sample of the media track, or free-viewpoint extension boxes included in MediaInformationBox or VisualSampleEntry (in ISO/IEC 14496-12) may be defined to describe specific extended or supplemented encoding information or other parameter information. Two specific examples are given below.

Example One

For single-track encapsulation of a free-viewpoint video, the media track uses a sample entry VisualSampleEntry. The sample entry VisualSampleEntry includes two boxes: a free viewpoint information box FreeViewExtInfoBox and a payload information box PayloadInfoBox.

The free viewpoint information box FreeViewExtInfoBox describes information of original capturing apparatuses corresponding to the free-viewpoint video data in the media track. Because a view corresponds to a capturing apparatus, camera information can be regarded as information of the view. Specific syntax and semantics are given as follows.

| | |
|---|---|
| Box Type: | 'fvei' |
| Container: | MediaInformationBox or VisualSampleEntry |
| Mandatory: | No |
| Quantity: | Zero or one. |

```
aligned(8) class FreeViewInfoBox extends FullBox(' fvin', 0, 0){
    unsigned int(1) texture__in__track;
    unsigned int(1) depth__in__track;
    unsigned int(16)num__cameras;
    for (i=0; i<num__cameras; i++) {
        unsigned int(16) camera__id;
        unsigned int(1) int__camera__flag;
        unsigned int(1) ext__camera__flag;
        if(int__camera __flag)
            IntCameraInfoStruct( );
        if(Ext__camera __flag)
            ExtCameraInfoStruct( );}}
```

The payload information box PayloadInfoBox describes texture map information TextureInfostruct( ) and depth map information DepthInfostruct( ) corresponding to original cameras/views in the free-viewpoint video in the media track. Specific syntax and semantics are given as follows.

```
aligned(8) class PayloadInfoBox extends FullBox(' plin', 0, 0){
unsigned int(1) texture__info__flag;
unsigned int(1) depth__info__flag;
unsigned int(16) num__cameras;
for (i=0; i<num__cameras; i++) {
        unsigned int(16)   camera__id;
    if(texture__info__flag)
            TextureInfostruct( );
    if(depth__info__flag)
            DepthInfostruct( );}}aligned(8) TextureInfostruct( ){
        unsigned int(8) texture__padding__size;
    unsigned int(16) texture__top__left__x;
    unsigned int(16) texture__top__left__y;
    unsigned int(16) texture__bottom__right__x;
    unsigned int(16) texture__bottom__right__y;}
aligned(8) DepthInfostruct( ){
    unsigned int(8) depth__padding__size;
    unsigned int(16) depth__top__left__x;
    unsigned int(16) depth__top__left__y;
    unsigned int(16) depth__bottom__right__x;
    unsigned int(16) depth__bottom__right__y;
    unsigned int(8) depth__range__near;
    unsigned int(8) depth__range__far;
        unsigned int(8) depth__scale__type;}
```

Example Two

For single-track encapsulation of a free-viewpoint video, the media track uses a sample entry VisualSampleEntry. The sample entry VisualSampleEntry includes a free-viewpoint extension information box FreeViewExtInfoBox. The free-viewpoint extension information box describes information of original capturing apparatuses corresponding to the free-viewpoint video data in the media track and texture map and depth map information corresponding to the original capturing apparatuses.

```
aligned(8) class FreeViewExtInfoBox extends FullBox(' fvei', 0, 0){
unsigned int(1) texture__in__track;
unsigned int(1) depth__in__track;
unsigned int(16) num__cameras;
for (i=0; i<num__cameras; i++) {
        unsigned int(16) camera__id;
unsigned int(1) int__camera__flag;
unsigned int(1) ext__camera__flag;
unsigned int(1) decoding__info__flag;
if(int__camera__flag)
        IntCameraInfoStruct( );
```

-continued

```
if(Ext__camera__flag)
ExtCameraInfoStruct( );
unsigned int(1) texture__info__flag;
unsigned int(1) depth__info__flag;
if(texture__info__flag){
        unsigned int(8) texture__padding__size;
        unsigned int(16) texture__top__left__x[i] ;
unsigned int(16) texture__top__left__y[i] ;
unsigned int(16) texture__bottom__right__x[i] ;
unsigned int(16) texture__bottom__right__y[i];
}
if(depth__info__flag){
unsigned int(8) depth__padding__size;
    unsigned int(16) depth__top__left__x[i] ;
unsigned int(16) depth__top__left__y[i] ;
unsigned int(16) depth__bottom__right__x[i] ;
unsigned int(16) depth__bottom__right__y[i];
unsigned int(8) depth__range__near;
unsigned int(8) depth__range__far;
unsigned int(8) depth__scale__type;}}}
``` where texture_in_track indicates whether the media track includes a texture map, where a value of 1 includes that the media track includes a texture map, and a value of 0 indicates that the media track does not include a texture map;

depth_in_track indicates whether the media track includes a depth map, where a value of 1 includes that the media track includes a depth map, and a value of 0 indicates that the media track does not include a depth map;

num_cameras indicates the number of original cameras corresponding to depth maps or texture maps in the media track;

camera_id indicates an identifier of each original camera;

int_camera_flag indicates whether an intrinsic parameter of the original camera is indicated, where a value of 1 indicates that the intrinsic parameter is indicated, a value of 0 indicates that the intrinsic parameter is not indicated, and for syntax of the intrinsic parameter, reference may be made to the syntax and semantics of IntCameraInfoStruct( ) in AVS3-P1; and ext_camera_flag indicates whether an extrinsic parameter of the original camera is indicated, where a value of 1 indicates that the extrinsic parameter is indicated, a value of 0 indicates that the extrinsic parameter is not indicated, and for syntax of the extrinsic parameter, reference may be made to the syntax and semantics of ExtCameraInfoStruct( ) in AVS3-P1.

The internal parameter and the extrinsic parameter of the original camera may be used to describe information of the original camera. Parameter information of one original camera is described in only one box.

texture_info_flag indicates whether metadata information describing a texture map is included, where a value of 1 indicates that metadata information describing a texture map is included, and a value of 0 indicates that metadata information describing a texture map is not included;

depth_info_flag indicates whether metadata information describing a depth map is included, where a value of 1 indicates that metadata information describing a depth map is included, and a value of 0 indicates that metadata information describing a depth map is not included;

texture_padding_size indicates the number of pixels padded to the texture map;

texture_top_left_x represents the top-left x coordinate of the texture map corresponding to a corresponding original camera in the video frame plane;

texture_top_left_y represents the top-left y coordinate of the texture map corresponding to the corresponding original camera in the video frame plane;

texture_bottom_right_x represents the bottom-right x coordinate of the texture map corresponding to a corresponding original camera in the video frame plane;

texture_bottom_right_y represents the bottom-right y coordinate of the texture map corresponding to the corresponding original camera in the video frame plane;

depth_padding_size indicates the number of pixels padded to the depth map;

depth_top_left_x represents the top-left x coordinate of the depth map corresponding to a corresponding original camera in the video frame plane;

depth_top_left_y represents the top-left y coordinate of the depth map corresponding to the corresponding original camera in the video frame plane;

depth_bottom_right_x represents the bottom-right x coordinate of the depth map corresponding to a corresponding original camera in the video frame plane;

depth_bottom_right_y represents the bottom-right y coordinate of the depth map corresponding to the corresponding original camera in the video frame plane;

depth_range_near represents a minimum quantized depth distance from the depth map to an optical center;

depth_range_far represents a maximum quantized depth distance from the depth map to the optical center; and depth_scale_type represents the type of down-sampling of the depth map.

It should be noted that the sample entry VisualSampleEntry includes a free viewpoint information box FreeViewExtInfoBox and a payload information box PayloadInfoBox.

In an embodiment, the free viewpoint information box FreeViewExtInfoBox includes track information, which may include an identifier of a track where the texture map is located and/or an identifier of a track where the depth map is located.

In an embodiment, the free viewpoint information box FreeViewExtInfoBox includes apparatus information of the capturing apparatus, and the apparatus information may include a capturing apparatus quantity, a capturing apparatus identifier, and capturing apparatus parameter information. It can be understood that any information related to the arrangement mode and attributes of the capturing apparatus may be encapsulated as apparatus information in the free viewpoint information box FreeViewExtInfoBox.

In an embodiment, the payload information box PayloadInfoBox includes attribute information of the texture map and/or attribute information of the depth map. The attribute information of the texture map may include a texture map information identifier, texture map image information, and the like. The attribute information of the depth map may include a depth map information identifier, depth map image information, and the like.

Figure 9:
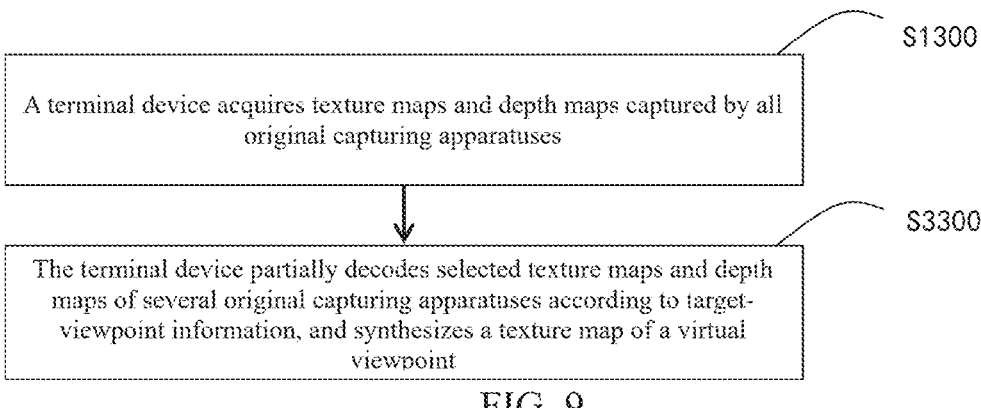
FIG. 9 is a flowchart of processing free-viewpoint video data encapsulated in a single track according to an embodiment of the present disclosure.

FIG. 9 is a flowchart of processing free-viewpoint video data encapsulated in a single track, including at least the following steps S1300 and S3300.

At S1300, a terminal device acquires texture maps and depth maps captured by all original capturing apparatuses.

At S3300, the terminal device partially decodes selected texture maps and depth maps of several original capturing apparatuses according to target-viewpoint information, and synthesizes a texture map of a virtual viewpoint.

Figure 10:
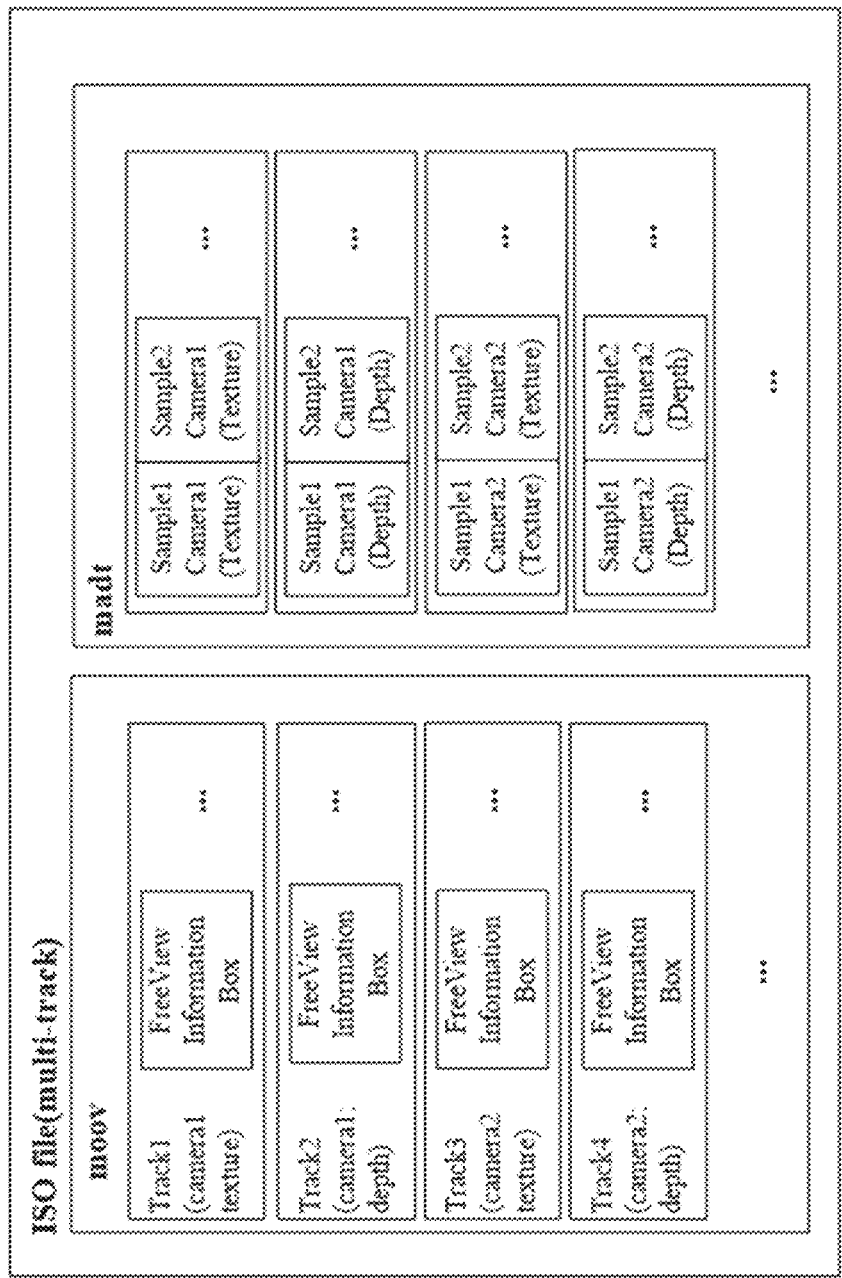
FIG. 10 is a diagram of a file structure of multi-track encapsulation of free-viewpoint video data according to an embodiment of the present disclosure.

FIG. 10 is a diagram of a file structure of multi-track encapsulation of free-viewpoint video data. As shown in FIG. 10, a media file based on the ISO BMFF format has multiple media tracks. Each track may encapsulate a texture map (i.e., texture map media track) or a depth map (i.e., depth map media track) captured by one original capturing apparatus. Through the multi-track encapsulation structure, any one of the captured texture maps or depth maps can be acquired flexibly.

The depth map may be represented by a grayscale map, and has high coding efficiency and low decoding complexity. A plurality of depth maps of a plurality of original capturing apparatuses may be encapsulated into one or more depth map media tracks. In addition, texture maps of a plurality of original cameras may also be encapsulated into one or more texture map media tracks.

In an implementation, as the image size, the encoding mode, and the like of the texture map of the original capturing apparatus are different from those of the depth map of the original capturing apparatus, the number of original capturing apparatuses corresponding to the texture map media track may be the same as or different from the number of original capturing apparatuses corresponding to the depth map media track. For example, when the number of original capturing apparatuses corresponding to the texture map media track is different from the number of original capturing apparatuses corresponding to the depth map media track, texture maps of m original capturing apparatuses are encapsulated in i texture map media tracks, and depth maps corresponding to the texture maps are encapsulated in j depth map media tracks, where i is not equal to j, i is less than or equal to m, and j is less than m. In another implementation, depth maps of a plurality of original capturing apparatuses may be stored in one media track, and texture maps corresponding to the depth maps may be stored in multiple media tracks.

Figure 11:
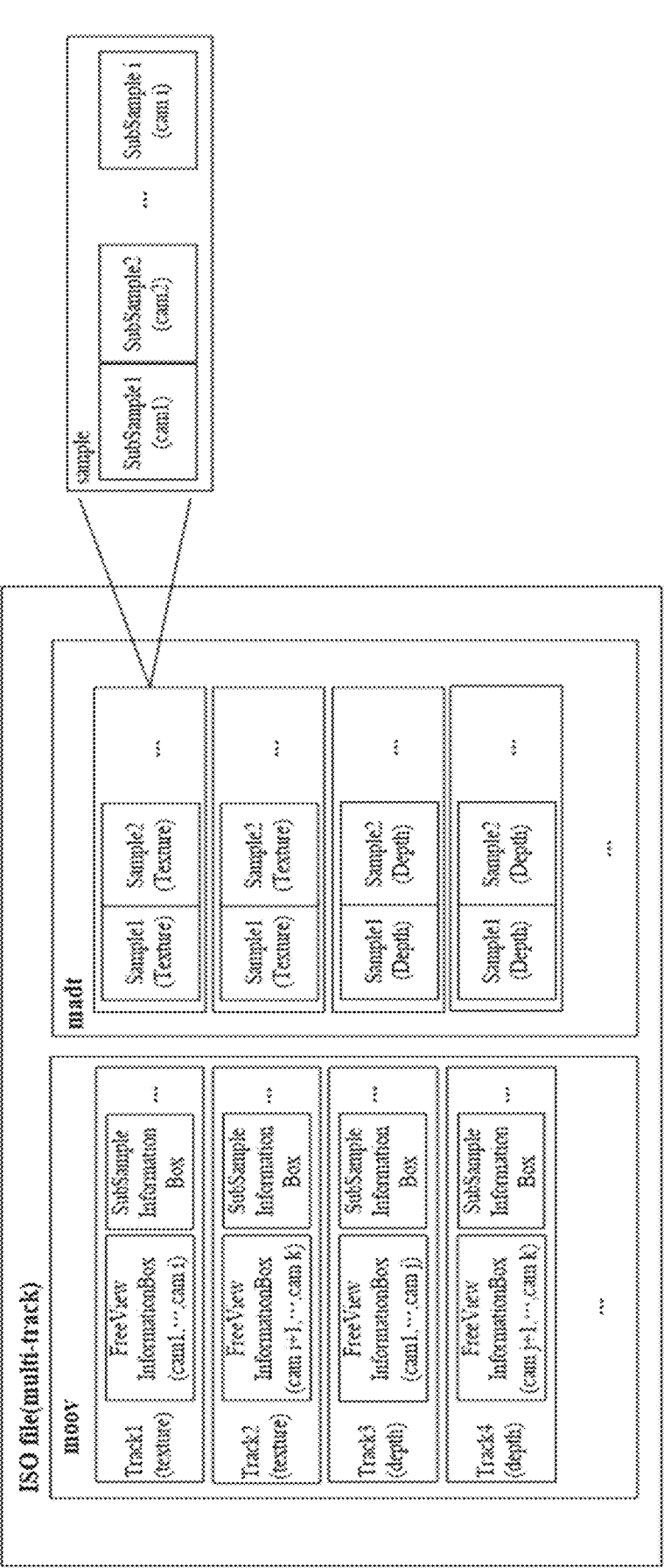
FIG. 11 is diagram of a media file structure diagram of a free-viewpoint video extended based on the multi-track encapsulation mode according to an embodiment of the present disclosure.

In an implementation, the original capturing apparatuses are grouped according to camera attributes such as position attributes of cameras deployed, intrinsic parameter attributes of the cameras, coding dependencies between texture maps or depth maps corresponding to the cameras, etc. Texture maps or depth maps of original capturing apparatuses in the same group are encapsulated in one media track. FIG. 11 is diagram of a media file structure diagram of a free-viewpoint video extended based on the multi-track encapsulation mode. As shown in FIG. 11, a file structure of free-viewpoint video data encapsulated in multiple tracks based on the same type of multi-maps is provided.

For multi-track encapsulation, each media track includes a MOOV box and a madt box. The MOOV box contains a sub-box FreeViewExtInfoBox, and metadata information of media is encapsulated in the MOOV box. Free-viewpoint video data is encapsulated in the madt box in the form of samples.

Free-viewpoint video data encapsulated in multiple tracks includes texture map data and depth map data acquired by a plurality of original capturing apparatuses. The texture map data and the depth map data are respectively stored in different media tracks. Further, the texture maps are stored in the texture map media track, and the depth maps are stored in the depth map media track. That is to say, each frame of image in the texture map media track includes texture maps captured by all the original capturing apparatuses at a particular moment, and each frame of image in the depth map media track includes depth maps captured by all the original capturing apparatuses at a particular moment. The texture map and the depth map of each original capturing apparatus are encoded and decoded in an associated manner, i.e., there is a dependency or mapping relationship between the encoding and decoding of texture map data and depth map data of one capturing apparatus. When the terminal device acquires free-viewpoint video encapsulated in multiple tracks, the texture map data and the depth map data captured by the corresponding original capturing apparatuses are transmitted according to the current view of the user, i.e., the target-viewpoint information.

After obtaining a media file including free-viewpoint video data corresponding to the target-viewpoint information, the terminal device selects texture maps and depth maps captured by several original capturing apparatuses corresponding to adjacent views required for synthesizing the virtual viewpoint from each frame of image, and decodes the selected texture maps and depth maps. For multi-track encapsulation, each sample in the texture map media track includes texture maps captured by the original capturing apparatuses at a particular moment, and each sample in the depth map media track includes depth maps captured by the original capturing apparatuses at a particular moment. Further, each sample may be further divided into sub-samples, each of which includes a texture map or a depth map corresponding to one capturing apparatus. To be specific, a box SubSampleInformationBox in SampleTableBox or TrackFragmentBox is used to describe sub-sample information. The use of sub-samples is based on a flags field in the sub-sample information box. The flags field can identify a data type stored in the sub-sample. When the value of the flags field is 0, the texture maps and the depth maps are located in media tracks. The specific composition structure of each sample corresponding to free-viewpoint video data is described using codec_specific_parameters.

The texture maps and the depth maps are respectively encapsulated in different media tracks, i.e., the texture maps are encapsulated in a texture map media track, and the depth maps are encapsulated in a depth map media track. The virtual viewpoint synthesis process is as follows. First, several original capturing apparatuses corresponding to views adjacent to the target view of view switching are determined, depth maps of the original capturing apparatuses are processed, and then the processed depth maps are combined with texture maps of the original capturing apparatuses to synthesize a texture map corresponding to the virtual viewpoint.

It can be understood that an association/reference/mapping relationship is established between the texture map media track and the depth map media track in which the texture map and the depth map of the same original capturing apparatus are respectively encapsulated. Three specific examples are given below.

Example One

TrackReferenceBox (Reference Track box) defined in ISO/IEC 14494-12 may be used to describe a reference relationship between media tracks. An already defined reference type reference_type 'auxl' or 'vdep' is used to describe auxiliary media (e.g., depth map) of the associated/referenced/mapped media track. In this embodiment, the method defined in ISO/IEC 14494-12 is directly used, and TrackReferenceBox is included in a depth map media track, to indicate that the depth map media track is associated with, references, or is mapped to a texture map media track corresponding to the same original capturing apparatus, where reference_type is 'auxl' or 'vdep'. Typically, 'auxl' is used for describing a reference or association relationship with decoding dependencies.

Example Two

TrackReferenceBox defined in ISO/IEC 14494-12 may be used to describe a reference relationship between tracks, and a new reference type reference_type is defined to describe that a texture map media track is associated with, references, or is mapped to a depth map media track. In this embodiment, reference_type is set to 'tdrf', and a texture map media track with the TrackReferenceBox including this reference type references or is associated with a depth map media track indicated in the TrackReferenceBox.

Example Three

The texture map media tracks and the depth map media tracks are grouped into track groups. This is especially suitable for cases where the original capturing apparatuses corresponding to the depth map media tracks do not completely correspond to the capturing apparatuses corresponding to the texture map media tracks. For example, depth maps of a plurality of original capturing apparatuses are stored in one media track, and texture maps corresponding to the texture maps are stored in multiple media tracks.

The media tracks are grouped into track groups in the following manner: grouping a texture map media track and a depth map media track that correspond to the same original capturing apparatus into one group. A box AttrAndDepGroupBox is used to represent a track group of the texture map media track and the depth map media track that correspond to the same original capturing apparatus. This box is obtained by extending TrackGroupTypeBox defined in ISO/IEC 14494-12, where track_group_type is set to 'tadg'. The specific syntax structure is as follows:

```
aligned(8) class AttrAndDepGroupBox extends
TrackGroupTypeBox(' tadg ') {
    unsigned int(8) num_camera;
    unsigned int(1) unequal_flag;
    for(int i=0; i<num_camera; i++)
        unsigned int(8) camera_id;
}
``` where num_camera indicates the number of original capturing apparatuses corresponding to texture maps in the media track group;

unequal_flag indicates whether the number of original capturing apparatuses corresponding to the depth map media track is the same as the number of original capturing apparatuses corresponding to the texture map media track in the media track group, where a value of 1 indicates that the number of original capturing apparatuses corresponding to the depth map media track is different from the number of original capturing apparatuses corresponding to the texture map media track in the media track group, and usually indicates that the number of original capturing apparatuses corresponding to the depth map media track is greater than the number of original capturing apparatuses corresponding to the texture map media track; and a value of 0 indicates that the number of original capturing apparatuses corresponding to the depth map media track is the same the number of original capturing apparatuses corresponding to the texture map media track in the media track group; and camera_id indicates an identifier of the same original capturing apparatus corresponding to the texture map and the depth map in the media track group.

In an implementation, when the value of unequal_flag is 1, one depth map media track may include multiple AttrAndDepGroupBoxes of the same type, but have different track_group_ids.

In an implementation, when a free-viewpoint video is encoded in an AVC MVD mode, a viewpoint identifier box ViewIdentifierBox with a box type of "vwid" defined in ISO/IEC 14494-15 may be used to describe a view corresponding to an original capturing apparatus in each media track, including an identifier of the view, other reference viewpoints corresponding to the view, and other information. This box may also be used to describe whether the media track includes a texture map only, or includes a depth map only, or includes both a texture map and a depth map.

In an implementation, when the depth map and the texture map are encapsulated in different media tracks, an association/reference/mapping relationship between the depth map media track and the texture map media track is described using a box TrackReferenceBox with a reference type reference_type 'deps'. This box is included in a depth map media track, to indicate that the depth map media track is associated with, references, or is mapped to a texture map media track corresponding to the same original capturing apparatus.

It should be noted that the sample entry VisualSampleEntry includes a free viewpoint information box AvsFreeViewInfoBox and a payload information box PayloadInfoBox.

In an embodiment, the free viewpoint information box AvsFreeViewInfoBox includes track information, which may include an identifier of a track where the texture map is located or an identifier of a track where the depth map is located.

In an embodiment, the free viewpoint information box AvsFreeViewInfoBox includes apparatus information of the capturing apparatus, and the apparatus information may include a capturing apparatus quantity, a capturing apparatus identifier, and capturing apparatus parameter information. It can be understood that any information related to the arrangement mode and attributes of the capturing apparatus may be encapsulated as apparatus information in the free viewpoint information box AvsFreeViewInfoBox.

In an embodiment, the payload information box PayloadInfoBox includes attribute information of the texture map and/or attribute information of the depth map. The attribute information of the texture map may include a texture map information identifier, texture map image information, and the like. The attribute information of the depth map may include a depth map information identifier, depth map image information, and the like.

It should be noted that multi-track encapsulation involves at least a texture map media track and a depth map media track. The sampling entry VisualSampleEntry of each texture map media track and depth map media track includes a free viewpoint information box AvsFreeViewInfoBox and a payload information box PayloadInfoBox.

Figure 12:
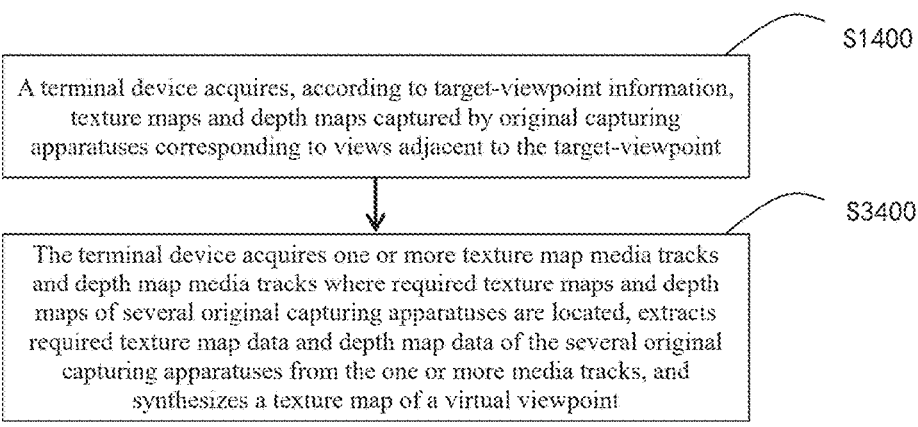
FIG. 12 is a flowchart of processing free-viewpoint video data encapsulated in multiple tracks according to an embodiment of the present disclosure.

FIG. 12 is a flowchart of processing free-viewpoint video data encapsulated in multi tracks, including at least the following steps S1400 and S3400.

At S1400, a terminal device acquires, according to target-viewpoint information, texture maps and depth maps captured by original capturing apparatuses corresponding to views adjacent to the target view.

At S3400, the terminal device acquires one or more texture map media tracks and depth map media tracks where required texture maps and depth maps of several original capturing apparatuses are located, extracts required texture map data and depth map data of the several original capturing apparatuses from the one or more media tracks, and synthesizes a texture map of a virtual viewpoint.

Compared with the single-track encapsulation that requires the terminal device to acquire the free-viewpoint video data captured by all the capturing apparatuses, for the multi-track encapsulation structure, the terminal device may selectively acquire the texture maps and/or the depth maps corresponding to the target-viewpoint information from the texture map media track and the depth map media track respectively according to the target-viewpoint information, so that the efficiency of data transmission and processing is improved.

In some application scenarios, the user viewing the free-viewpoint video may actively performs view switching at will, or may perform view switching passively, e.g., based on the director's recommendation. In this case, it is necessary to define timed metadata of the dynamic view to describe the dynamically changing view information and corresponding original capturing apparatus information, i.e., establish an association between the view and video playback time. Therefore, during playback of the free-viewpoint video, content corresponding to a view recommended at a particular moment needs to be synthesized according to the recommended view and original capturing apparatus information of views adjacent to the recommended view. The timed metadata is encapsulated in a timed metadata track. The timed metadata track is associated with a media track where the free-viewpoint video data corresponding to the target view is located.

The sample entry type of the timed metadata track of the dynamic view is 'dyfv', and the syntax is defined as follows.

```
DynamicFreeViewSampleEntry extends MetaDataSampleEntry ('dyfv'){
string freeview_description;
unsigned int(8) play_camera_id;
}
``` where freeview_description is a null-terminated string that provides text description information of a free viewpoint; and play_camera_id indicates an identifier of an original camera corresponding to the view at the time of initial playback, which usually does not require virtual viewpoint synthesis.

Each sample in the timed metadata track of the dynamic view describes the specific dynamic changes of the view in a free-viewpoint sample format.

```
aligned(8) FreeviewSample( ){
unsigned int(1) dynamic_switch_flag;
if(dynamic_switch_flag)
        unsigned int(1) virtual_view_flag;
    if(virtual_view_flag){
unsigned int(8) original_camera_num;
for(int i=0; i<original_camera_num; i++){
unsigned int(8) original_camera_id[i];
unsigned int(1) int_camera_flag;
unsigned int(1) ext_camera_flag;
if(int_camera_flag)
    IntCameraInfoStruct( );
if(ext_camera_flag)
ExtCameraInfoStruct( );
FreeViewStruct( );
}
else
unsigned int(8) play_camera_id;}}
aligned(8) class FreeViewStruct( ){
signed int(32) freeview_x;
signed int(32) freeview_y;
signed int(32) freeview_y;
unsigned int(1) rotation_flag;
```

-continued

```
bit(7) reserved = 0;
if(rotation_flag) {
    signed int(32) freeview_yaw;
    signed int(32) freeview_pitch;
    signed int(32) freeview_roll;}}
``` where dynamic_switch_flag indicates whether to perform view switching in the sample, where a value of 1 indicates that view switching needs to be performed, and a value of 0 indicates that view switching does not need to be performed and the view in a previous sample is used;

virtual_camera_flag indicates whether virtual viewpoint synthesis needs to be performed, where a value of 1 indicates that virtual viewpoint synthesis needs to be performed, and a value of 0 indicates that virtual viewpoint synthesis does not need to be performed and the target view of view switching directly corresponds to an original camera;

original_camera_num indicates the number of original cameras required for synthesizing a virtual viewpoint;

original_camera_id indicates an identifier of an original camera required for synthesizing the virtual viewpoint;

play_camera_id indicates an identifier of an original camera corresponding to the target view when virtual viewpoint synthesis does not need to be performed;

FreeViewStruct( ) describes a parameter structure of the free viewpoint;

Freeview_x, Freeview_y, and Freeview_y, respectively indicate x-axis, y-axis, and z-axis coordinate values of the free viewpoint in a common reference coordinate system;

grotation_flag indicates whether the rotation of the free viewpoint is expressed, where a value of 1 indicates that the rotation of the free viewpoint is expressed, and a value of 0 indicates that the rotation of the free viewpoint is not expressed; and freeview_yaw, freeview_pitch, and freeview_roll respectively indicate angles of rotation of the free viewpoint with respect to the common reference coordinate system.

If parameter information of an original camera is already present in the MediaInformationBox or SampleEntry, there is no need to repeatedly describe the parameter information in the sample format, and the values of int_camera_flag and ext_camera_flag are 0.

The metadata track of the dynamic view may be associated with or reference one or more media tracks including depth maps and/or texture maps of original capturing apparatuses by using a track reference box with a reference type 'cdsc'.

With the method of view switching based on the director's recommendation in the above embodiments, the content corresponding to the recommended view can be synthesized in advance according to the recommended view and the original camera information of the views adjacent to the recommended view. In this way, the requirements on the data processing performance of the terminal devices and other apparatuses are lowered, and the video processing efficiency is further improved, thereby improving the viewing experience of the user, and expanding the range of application scenarios of free-viewpoint video.

Figure 13:
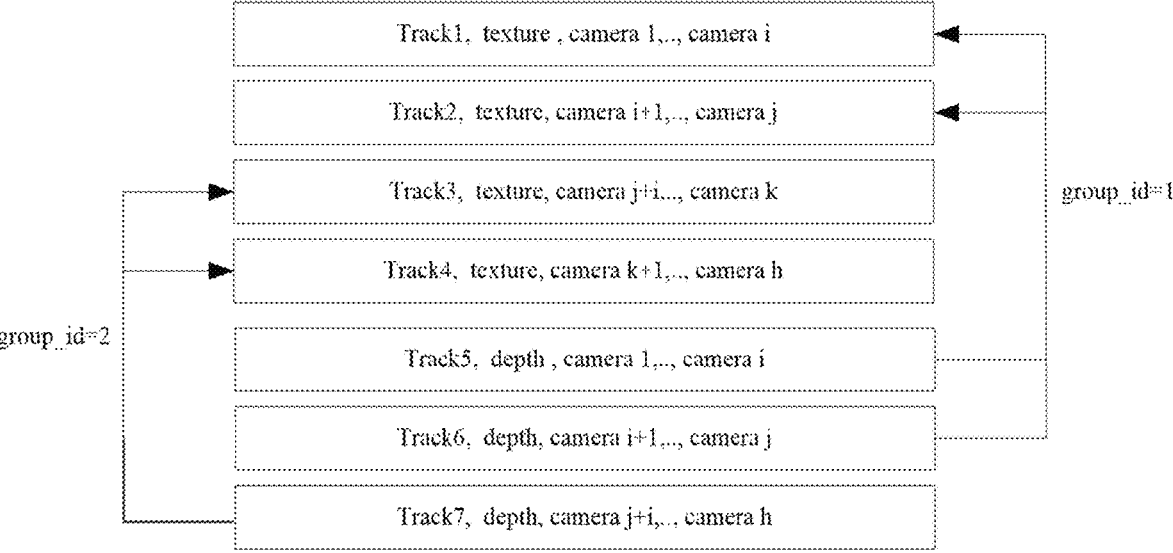
FIG. 13 is a schematic diagram of grouping of media tracks according to an embodiment of the present disclosure.

In some application scenarios, because attributes of different original capturing apparatuses are different, e.g., the original capturing apparatuses are arranged at different positions, and use different image capturing frequencies and different compression modes for image capturing, there are often differences in media processing during the process of free view switching performed by the user. For example, texture maps and depth maps captured by original capturing apparatuses in the same area can be synthesized into a virtual viewpoint, but texture maps and depth maps captured by original capturing apparatuses in different areas, e.g., in two rooms, cannot be synthesized into a virtual viewpoint. Therefore, in this embodiment, a method of grouping the texture map media tracks and the depth map media tracks of the original capturing apparatuses according to the attributes of the original capturing apparatuses is provided, and the texture map media tracks and the depth map media tracks of the original capturing apparatuses having the same attribute (e.g., position attribute) are grouped into one track group. FIG. 13 is a schematic diagram of grouping of media tracks. An example of grouping texture map media tracks and depth map media tracks into groups based on attributes of original cameras is illustrated in FIG. 13.

As shown in FIG. 13, tracks 1 to 4 are texture map media tracks, and tracks 5 to 7 are depth map media tracks. Because the tracks 3, 4, and 7 satisfy a preset track grouping condition and the tracks 1, 2, 5, and 6 satisfy the preset track grouping condition, the tracks 3, 4, and 7 are grouped into one media track group, and the tracks 1, 2, 5, and 6 are grouped into one media track group. When the terminal device requests free-viewpoint video data, data of one media track group is transmitted together, so the terminal device can obtain image data corresponding to the target view in a targeted manner, and process the set of data.

In an embodiment, a box CamAttrGroupBox is used to represent a track group of the texture map media track and the depth map media track based on attributes of original capturing apparatuses. This box is obtained by extending TrackGroupTypeBox defined in ISO/IEC 14494-12, where track_group_type is set to 'caag'. The specific syntax structure is as follows:

```
aligned(8) class CamAttrGroupBox extends
TrackGroupTypeBox(' caag ',0,0) {
    string group_description;
    unsigned int(8) num_camera;
    for(int i=0; i<num_camera; i++)
        unsigned int(8) camera_id;
}
``` where group_description is a null-terminated string that provides text description information of grouping based on attributes of original capturing apparatuses;

num_camera indicates the number of original capturing apparatuses corresponding to texture maps in the media track group; and camera_id indicates an identifier of a corresponding original capturing apparatus in the track group.

In an embodiment, EntityToGroupBox defined in ISO/IEC 14494-12 is extended to describe a track group of the texture map media track and the depth map media track based on attributes of original capturing apparatuses. A grouping type grouping_type is set to 'caeg'. The specific syntax structure is as follows.

```
aligned(8) class CamAttrEntityGroupBox extends
EntityToGroupBox(' caeg ',0,0) {string
group_description; unsigned int(8) num_camera; for(int i=0;
```

-continued

```
    i<num_camera; i++)unsigned
    int(8) camera_id;
        }
```

In an embodiment, the grouping based on factors such as attributes of original cameras may be grouping of only depth map media tracks, grouping of only texture map media tracks, or grouping of both texture map media tracks and corresponding depth map media tracks.

In another embodiment, when only depth map media tracks or texture map media tracks are grouped, a similar effect can be achieved through an association between depth map media tracks and texture map media tracks.

Figures 14, 15:
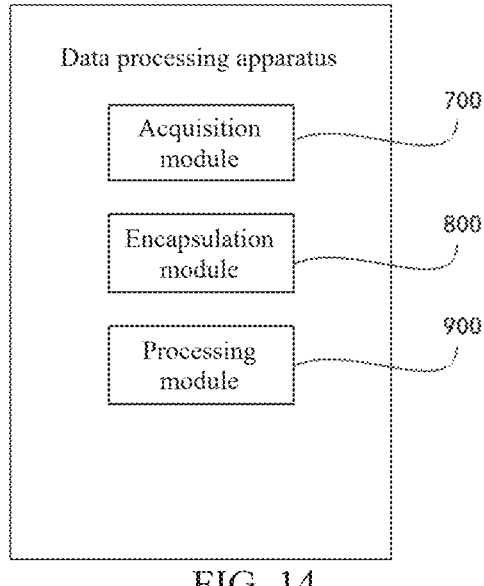
FIG. 14 is a schematic structural diagram of a data processing apparatus according to an embodiment of the present disclosure.
FIG. 15 is a schematic structural diagram of a data processing apparatus according to an embodiment of the present disclosure.

FIG. 14 is a schematic structural diagram of a data processing apparatus according to an embodiment of the present disclosure. As shown in FIG. 14, the data processing apparatus provided in the embodiments of the present disclosure is applied to a terminal device, and can execute the data processing method provided in the embodiments of the present disclosure. The terminal device has functional modules and technical effects corresponding to the method executed. The apparatus may be implemented by software, hardware, or a combination thereof, and includes an acquisition module 700, an encapsulation module 800, and a processing module 900.

The acquisition module 700 is configured for acquiring free-viewpoint video data.

In an implementation, the acquisition module 700 is further configured for acquiring target-viewpoint information.

The encapsulation module 800 is configured for encapsulating a texture map in a media track.

In an implementation, the encapsulation module 800 is configured for encapsulating texture maps captured by capturing apparatuses into one media track.

In an implementation, the encapsulation module 800 is configured for encapsulating texture maps captured by capturing apparatuses into multiple media tracks.

In an implementation, the encapsulation module 800 is configured for encapsulating depth maps captured by capturing apparatuses into one media track.

In an implementation, the encapsulation module 800 is configured for encapsulating depth maps captured by capturing apparatuses into multiple media tracks.

In an implementation, the encapsulation module 800 is configured for encapsulating texture maps and depth maps captured by capturing apparatuses into one media track.

In an implementation, the encapsulation module 800 is configured for encapsulating texture maps and depth maps captured by capturing apparatuses into multiple media tracks.

The processing module 900 is configured for processing the free-viewpoint video data according to the target-viewpoint information.

In an implementation, the processing module 900 is configured for decoding or decapsulating requested free-viewpoint video data, acquiring corresponding free-viewpoint video data according to the target-viewpoint information, and processing the acquired free-viewpoint video data, e.g., extracting a texture map corresponding to a real viewpoint or a texture map corresponding to a synthesized virtual viewpoint. Further, the processing module 900 is configured for decoding or decapsulating a requested media file of free-viewpoint video or processed media data, extracting corresponding free-viewpoint video data according to the requested media file and a viewing position and a viewing direction of a user after view switching, and then performing media processing.

FIG. 15 is a schematic structural diagram of a data processing apparatus according to an embodiment of the present disclosure. As shown in FIG. 15, based on the embodiment shown in FIG. 14, the data processing apparatus further includes a display module 1000 configured for displaying an image based on the free-viewpoint video data processed by the processing module. That is to say, according to a processing result of the processing module 900, the display module 1000 displays a texture map of a real viewpoint corresponding to the current view to the user, or displays a texture map of a virtual viewpoint corresponding to the current view to the user.

Figure 16:
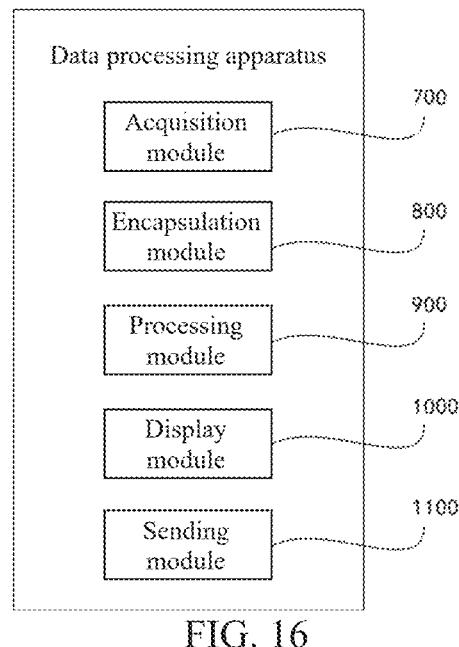
FIG. 16 is a schematic structural diagram of a data processing apparatus according to an embodiment of the present disclosure.

FIG. 16 is a schematic structural diagram of a data processing apparatus according to an embodiment of the present disclosure. As shown in FIG. 16, based on the embodiment shown in FIG. 15, the data processing apparatus further includes a sending module 1100, configured for sending a data request to the server.

In an implementation, the sending module 1100 is further configured for sending the target-viewpoint information to the server.

It should be noted that the data processing apparatus may not include the encapsulation module 800, but include a storage module 1500. the figure is a schematic structural diagram of a data processing apparatus according to an embodiment of the present disclosure. As shown in the figure, the data processing apparatus includes an acquisition module 700, an encapsulation module 800, and a processing module 900. The functions of the acquisition module 700 and the processing module 900 are the same as those described in the above embodiments, so the details will not be repeated herein. The storage module 1500 is configured for storing a media file in which free-viewpoint video data is encapsulated.

Figure 17:
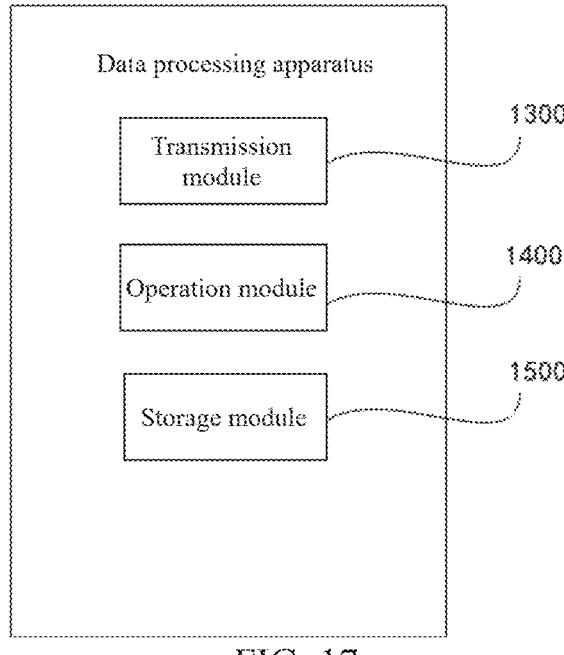
FIG. 17 is a schematic structural diagram of a data processing apparatus according to an embodiment of the present disclosure.

FIG. 17 is a schematic structural diagram of a data processing apparatus according to an embodiment of the present disclosure. As shown in FIG. 17, the data processing apparatus provided in the embodiments of the present disclosure is applied to a media server, and can execute the data processing method provided in the embodiments of the present disclosure. The server has functional modules and technical effects corresponding to the method executed. The apparatus may be implemented by software, hardware, or a combination thereof, and includes a transmission module 1300, an operation module 1400, and a storage module 1500.

The transmission module 1300 is configured for receiving a request message from a terminal device, and sending target-viewpoint information and free-viewpoint video data according to the request message. In an embodiment, the transmission module 1300 sends a media file stored in the storage module 1500 or media data processed by the operation module 1400. The reception or transmission may be implemented via a wireless network provided by a communication provider, a locally established wireless local area network, or a wired mode.

The operation module 1400 is configured for acquiring a required media file from the storage module 1500 according to the request message, extracting corresponding free-viewpoint video data from the media file, and processing the extracted free-viewpoint video data.

The storage module 1500 is configured for storing a media file in which free-viewpoint video data is encapsulated.

Figure 18:
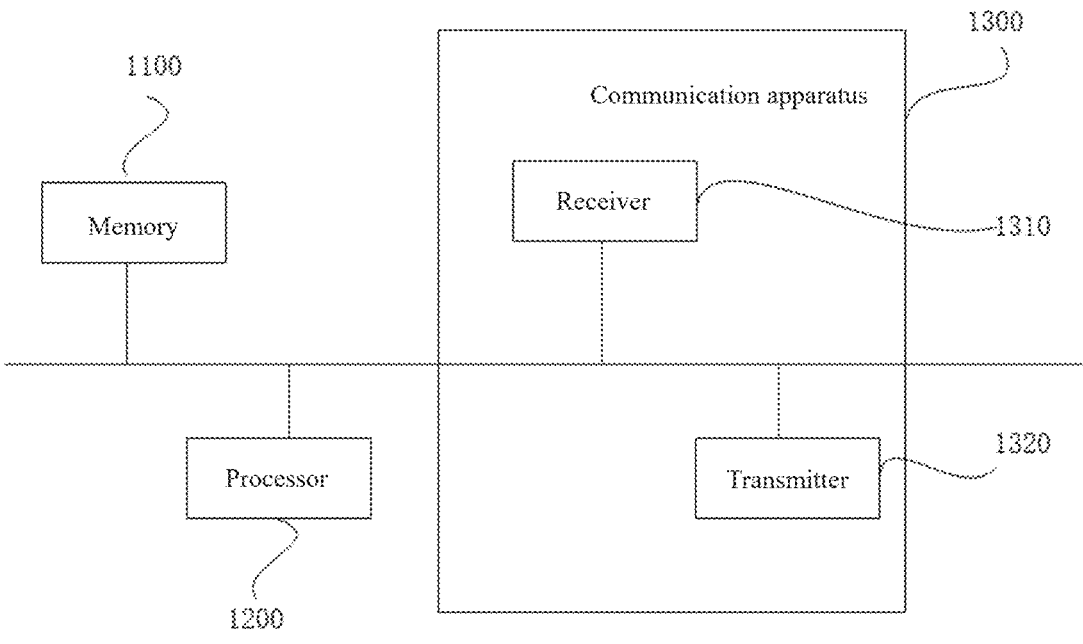
FIG. 18 is a schematic structural diagram of a data processing device according to an embodiment of the present disclosure.

FIG. 18 is a schematic structural diagram of a data processing device according to an embodiment of the present disclosure. As shown in FIG. 18, the data processing device includes a memory 1600, a processor 1700, and a communication apparatus 1800. The device may include one or more memories 1600 and one or more processors 1700. FIG. 16 uses one memory 1600 and one processor 1700 as an example. The memory 1600 and the processor 1700 may be connected by a bus or in other ways. Connection by a bus is used as an example in FIG. 16.

The memory 1600, as a computer-readable storage medium, may be configured for storing a software program, a computer-executable program, and modules, for example, program instructions/modules corresponding to the media information processing method provided in any embodiment of the present disclosure. The processor 1700 runs the software program, instructions, and modules stored in the memory 1600, to implement the data processing method.

The memory 1600 may mainly include a program storage area and a data storage area. The program storage area may store an operating system, and an application required by at least one function. In addition, the memory 1600 may include a high-speed random access memory, and may also include a nonvolatile memory, e.g., at least one magnetic disk storage device, flash memory device, or other nonvolatile solid-state storage device. In some examples, the memory 1600 may further include memories located remotely from the processor 1700, and the remote memories may be connected to the device via a network. Examples of the network include, but not limited to, the Internet, an intranet, a local area network, a mobile communication network, and combinations thereof.

The communication apparatus 1800 is configured for sending and receiving information under the control of the processor 1700.

In an embodiment, the communication apparatus 1800 includes a receiver 1810 and a transmitter 1820. The receiver 1810 is a module or combination of devices for receiving data in the device. The transmitter 1820 is a module or combination of devices for sending data in the device.

Figure 19:
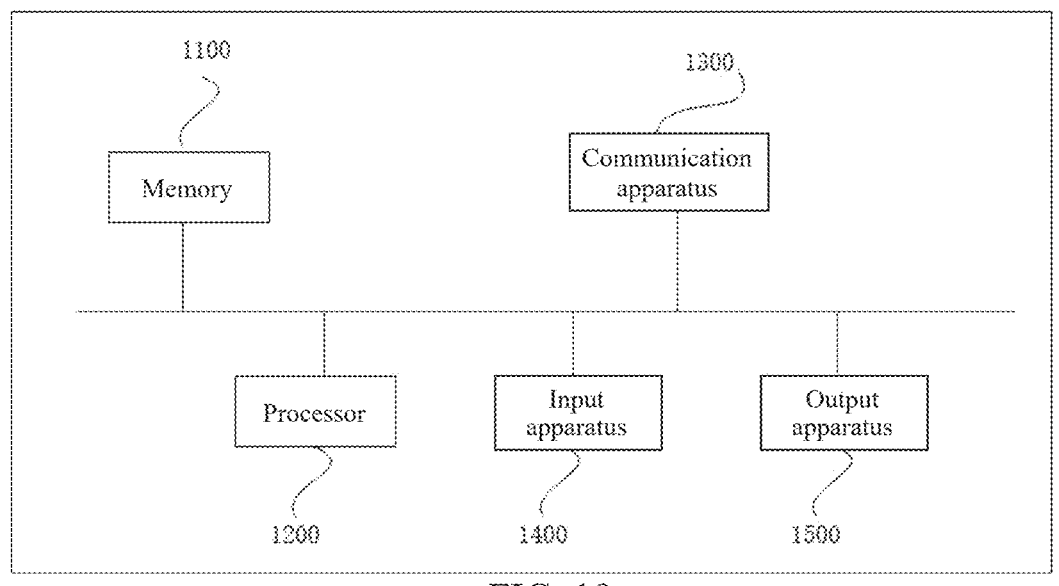
FIG. 19 is a schematic structural diagram of a data processing device according to an embodiment of the present disclosure.

FIG. 19 is a schematic structural diagram of a data processing device according to an embodiment of the present disclosure. As shown in FIG. 19, in an embodiment, the data processing device may further include an input apparatus 1400 and an output apparatus 1500.

The input apparatus 1900 may be configured for receiving inputted numerical or character information, and generating a signal input related to user settings and function control of the device. The output apparatus 2000 may include a display device such as a display screen.

An embodiment of the present disclosure provides a computer-readable storage medium, storing a computer-executable instruction which, when executed by a processor, causes the processor to implement the data processing method provided in any embodiment of the present disclosure.

An embodiment of the present disclosure provides a computer program product, including a computer program or computer instructions stored in a computer-readable storage medium, where a processor of a computer device reads the computer program or the computer instructions from the computer-readable storage medium, and executes the computer program or the computer instructions to cause the computer device to implement the data processing method provided in any embodiment of the present disclosure.

The system architecture and application scenarios described in the embodiments of the present disclosure are for the purpose of illustrating the technical schemes of the embodiments of the present disclosure more clearly, and do not constitute a limitation on the technical schemes provided in the embodiments of the present disclosure. Those having ordinary skills in the art may know that with the evolution of the system architecture and the emergence of new application scenarios, the technical schemes provided in the embodiments of the present disclosure are also applicable to similar technical problems.

Those having ordinary skills in the art can understand that all or some of the steps in the methods disclosed above and the functional modules/units in the system and the apparatus can be implemented as software, firmware, hardware, and appropriate combinations thereof.

In a hardware implementation, the division of the functional modules/units mentioned in the above description does not necessarily correspond to the division of physical components. For example, one physical component may have multiple functions, or one function or step may be jointly executed by several physical components. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information passing medium.

As used in this description, the terms "component", "module", "system" and the like are used to denote computer-related entities, hardware, firmware, a combination of hardware and software, software, or software in execution. For example, a component may be, but not limited to, a process running on a processor, a processor, an object, an executable file, a thread of execution, a program, or a computer. An application running on a computing device and the computing device may both be illustrated as components. One or more components may reside in a process or thread of execution. A component may be located on one computer or distributed on two or more computers. In addition, the components may be executed from various computer-readable media having various data structures stored therein. The components may communicate via local and/or remote processes such as in accordance with a signal having one or more data packets (e.g., data from one component interacting with another component in a local system, distributed system, and/or across a network such as the Internet with other systems via the signal).

Although some embodiments of the present disclosure are described above with reference to the accompanying drawings, these embodiments are not intended to limit the protection scope of the present disclosure. Any modifications, equivalent replacements and improvements made by those having ordinary skill in the art without departing from the scope and essence of the present disclosure shall fall within the protection scope of the present disclosure.

What is claimed is:

1. A data processing method, comprising:
  acquiring free-viewpoint video data, wherein the free-viewpoint video data comprises at least one texture map and/or at least one depth map;
  encapsulating the at least one texture map and/or the at least one depth map in at least one media track; and
  processing the free-viewpoint video data according to target-viewpoint information;
  wherein encapsulating the at least one texture map and/or the at least one depth map in at least one media track comprises:
  encapsulating the at least one texture map and/or the at least one depth map captured by a capturing apparatus in at least one media track, comprising:
    encapsulating a texture map captured by the at least one capturing apparatus in at least one texture map media track; and
    encapsulating a depth map captured by the at least one capturing apparatus in at least one depth map media track;
    wherein:
    a sample entry of the texture map media track comprises a first texture map box;
    a sample entry of the depth map media track comprises a first depth map box;
    the first texture map box comprises apparatus information of the capturing apparatus corresponding to the texture map media track or attribute information of the texture map; and
    the first depth map box comprises apparatus information of the capturing apparatus corresponding to the depth map media track or attribute information of the depth map.

2. The method of claim 1, wherein encapsulating the at least one texture map and/or the at least one depth map captured by a capturing apparatus in at least one media track comprises:
  encapsulating a texture map and/or a depth map captured by at least one capturing apparatus in a first media track.

3. The method of claim 2, wherein:
  a sample of the first media track comprises at least one sub-sample; and
  the sub-sample comprises the texture map and/or the depth map.

4. The method of claim 3, wherein that the sub-sample comprises the texture map and/or the depth map comprises at least one of:
  the sub-sample comprises texture maps and depth maps captured by a plurality of capturing apparatuses; or
  the sub-sample comprises a texture map and/or a depth map captured by one capturing apparatus.

5. The method of claim 2, wherein:
  a sample entry of the first media track comprises a first box and/or a second box;
  the first box comprises apparatus information of the capturing apparatus; and
  the second box comprises attribute information of the texture map and/or the depth map.

6. The method of claim 1, wherein:
  the sample entry of the texture map media track further comprises a second texture map box;
  the sample entry of the depth map media track further comprises a second depth map box;
  the second texture map box comprises apparatus information of the capturing apparatus corresponding to the texture map media track or attribute information of the texture map;
  the second depth map box comprises apparatus information of the capturing apparatus corresponding to the depth map media track or attribute information of the depth map; and
  information comprised in the first texture map box is different from information comprised in the second texture map box, and information comprised in the first depth map box is different from information comprised in the second depth map box.

7. The method of claim 5, wherein:
  the first box further comprises track information; and
  the track information comprises at least one of: an identifier of a track where the texture map is located, or an identifier of a track where the depth map is located.

8. The method of claim 1, wherein:
  the first texture map box further comprises an identifier of a track where the texture map is located; and
  the first depth map box further comprises an identifier of a track where the depth map is located.

9. The method of claim 5, wherein:
  the apparatus information of the capturing apparatus comprises at least one of: a capturing apparatus quantity, a capturing apparatus identifier, or capturing apparatus parameter information;
  the attribute information of the texture map comprises at least one of: a texture map information identifier or texture map image information; and
  the attribute information of the depth map comprises at least one of: a depth map information identifier or depth map image information.

10. The method of claim 1, further comprising:
  acquiring the target-viewpoint information,
  wherein acquiring free-viewpoint video data comprises:
  acquiring, according to the target-viewpoint information, free-viewpoint video data corresponding to the target view.

11. The method of claim 10, wherein:
  acquiring, according to the target-viewpoint information, free-viewpoint video data corresponding to the target view comprises:
  acquiring a texture map and/or a depth map corresponding to the target view according to the target-viewpoint information.

12. The method of claim 10, wherein:
  acquiring the target-viewpoint information comprises:
  acquiring the target-viewpoint information according to a timed metadata track, wherein the target view dynamically changes according to an indication of the timed metadata track.

13. The method of claim 1, wherein:
  the target-viewpoint information comprises at least one of: a capturing apparatus identifier, capturing apparatus parameter information, target view position information, target view rotation information, or a target view identifier.

14. The method of claim 12, wherein:

the timed metadata track is associated with a media track where the free-viewpoint video data corresponding to the target view is located.

15. The method of claim 1, wherein processing the free-viewpoint video data according to target-viewpoint information comprises:

selecting, according to the free-viewpoint video data and the target-viewpoint information, a texture map and a depth map captured by a capturing apparatus corresponding to the target view, and synthesizing a texture map corresponding to the target view according to the texture map and the depth map;

or selecting, according to the free-viewpoint video data and the target-viewpoint information, a texture map captured by a capturing apparatus corresponding to the target view.

16. A non-transitory computer-readable storage medium, storing a computer-executable instruction which, when executed by a processor, causes the processor to carry out a data processing method, the method comprising:

acquiring free-viewpoint video data, wherein the free-viewpoint video data comprises at least one texture map and/or at least one depth map;

encapsulating the at least one texture map and/or the at least one depth map in at least one media track; and processing the free-viewpoint video data according to target-viewpoint information;

wherein encapsulating the at least one texture map and/or the at least one depth map in at least one media track comprises:

encapsulating the at least one texture map and/or the at least one depth map captured by a capturing apparatus in at least one media track, comprising:

encapsulating a texture map captured by the at least one capturing apparatus in at least one texture map media track; and encapsulating a depth map captured by the at least one capturing apparatus in at least one depth map media track;

wherein:

a sample entry of the texture map media track comprises a first texture map box;

a sample entry of the depth map media track comprises a first depth map box;

the first texture map box comprises apparatus information of the capturing apparatus corresponding to the texture map media track or attribute information of the texture map; and the first depth map box comprises apparatus information of the capturing apparatus corresponding to the depth map media track or attribute information of the depth map.

17. A computer program product, comprising a computer program or computer instructions stored in a non-transitory computer-readable storage medium, a processor of a computer device reads the computer program or the computer instructions from the computer-readable storage medium and executes the computer program or the computer instructions to cause the computer device to carry out a data processing method, the method comprising:

acquiring free-viewpoint video data, wherein the free-viewpoint video data comprises at least one texture map and/or at least one depth map;

encapsulating the at least one texture map and/or the at least one depth map in at least one media track; and processing the free-viewpoint video data according to target-viewpoint information;

wherein encapsulating the at least one texture map and/or the at least one depth map in at least one media track comprises:

encapsulating the at least one texture map and/or the at least one depth map captured by a capturing apparatus in at least one media track, comprising:

encapsulating a texture map captured by the at least one capturing apparatus in at least one texture map media track; and encapsulating a depth map captured by the at least one capturing apparatus in at least one depth map media track;

wherein:

a sample entry of the texture map media track comprises a first texture map box;

a sample entry of the depth map media track comprises a first depth map box;

the first texture map box comprises apparatus information of the capturing apparatus corresponding to the texture map media track or attribute information of the texture map; and the first depth map box comprises apparatus information of the capturing apparatus corresponding to the depth map media track or attribute information of the depth map.

* * * * *